United States Patent [19]

Takei

[11] Patent Number: 5,701,042
[45] Date of Patent: Dec. 23, 1997

[54] LINEAR DIRECT CURRENT MOTOR

[75] Inventor: Seiji Takei, Kanagawa, Japan

[73] Assignee: Nippon Thompson Co., Ltd., Tokyo, Japan

[21] Appl. No.: 553,903

[22] Filed: Nov. 6, 1995

[30] Foreign Application Priority Data

Nov. 7, 1994 [JP] Japan ................................. 6-297853

[51] Int. Cl.$^6$ ................................................. H02K 41/00
[52] U.S. Cl. ................................................. 310/12; 318/135
[58] Field of Search ................................. 310/12, 13, 14; 318/135

[56] References Cited

U.S. PATENT DOCUMENTS 5,245,232  9/1993  Nihei et al. ................................. 310/12

Primary Examiner—Steven L. Stephan
Assistant Examiner—Judson H. Jones
Attorney, Agent, or Firm—Sughrue, Mion, Zinn, Macpeak & Seas, PLLC

[57] ABSTRACT

The linear direct current motor is described that is able to maintain stable thrust at all times regardless of changes in the relative positions of the primary and secondary sides.

The endmost magnetic poles of a field magnet are used as non-detected magnetic poles with respect to magnetic pole discrimination elements, while these non-detected magnetic poles are used only as driving magnets for generation of thrust, thereby reducing the range of variation in the number of conductors of armature coils that actually generate thrust. In addition, since the drive current supplied to the armature coils is in the form of a constant current, changes in thrust can be further reduced.

7 Claims, 22 Drawing Sheets

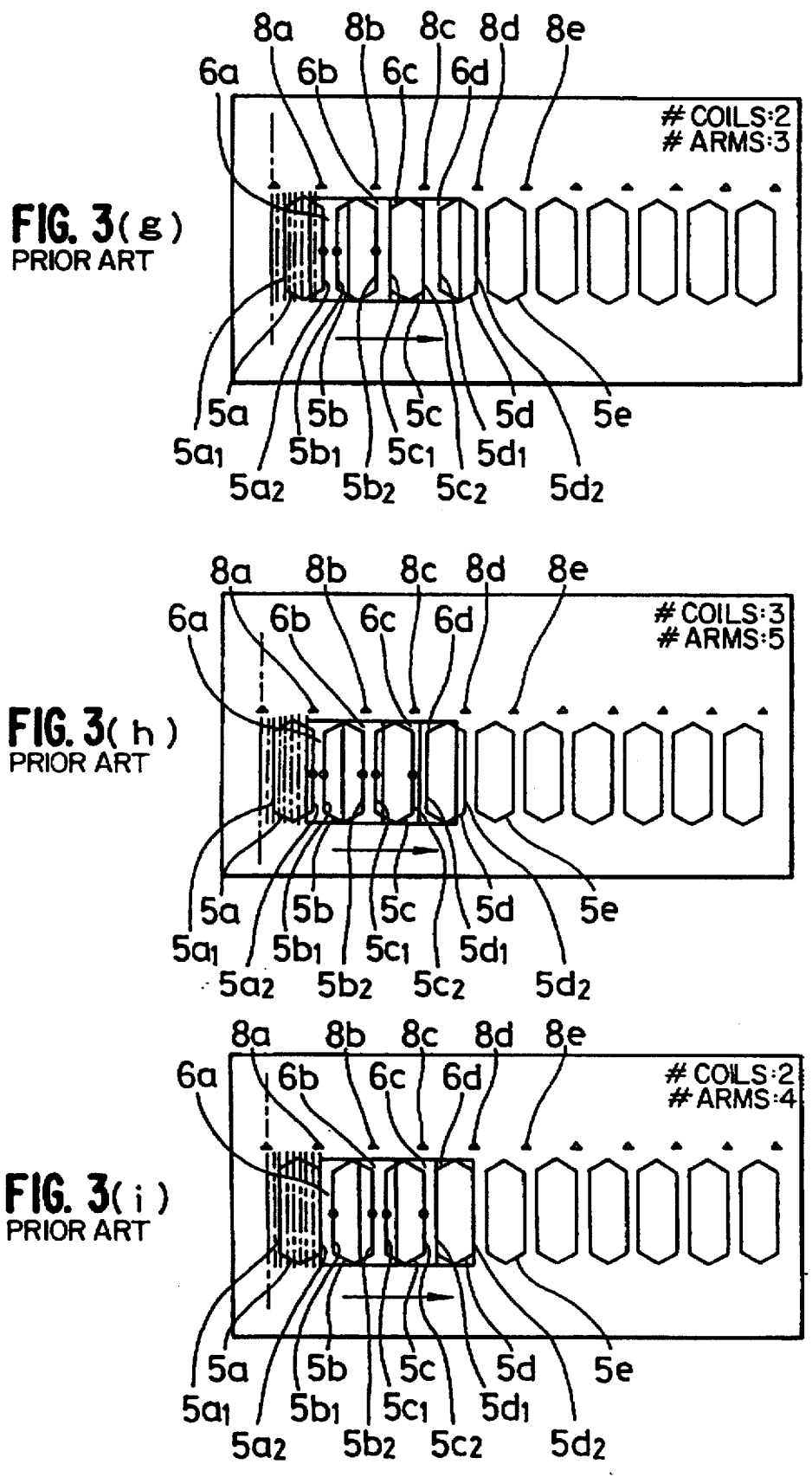

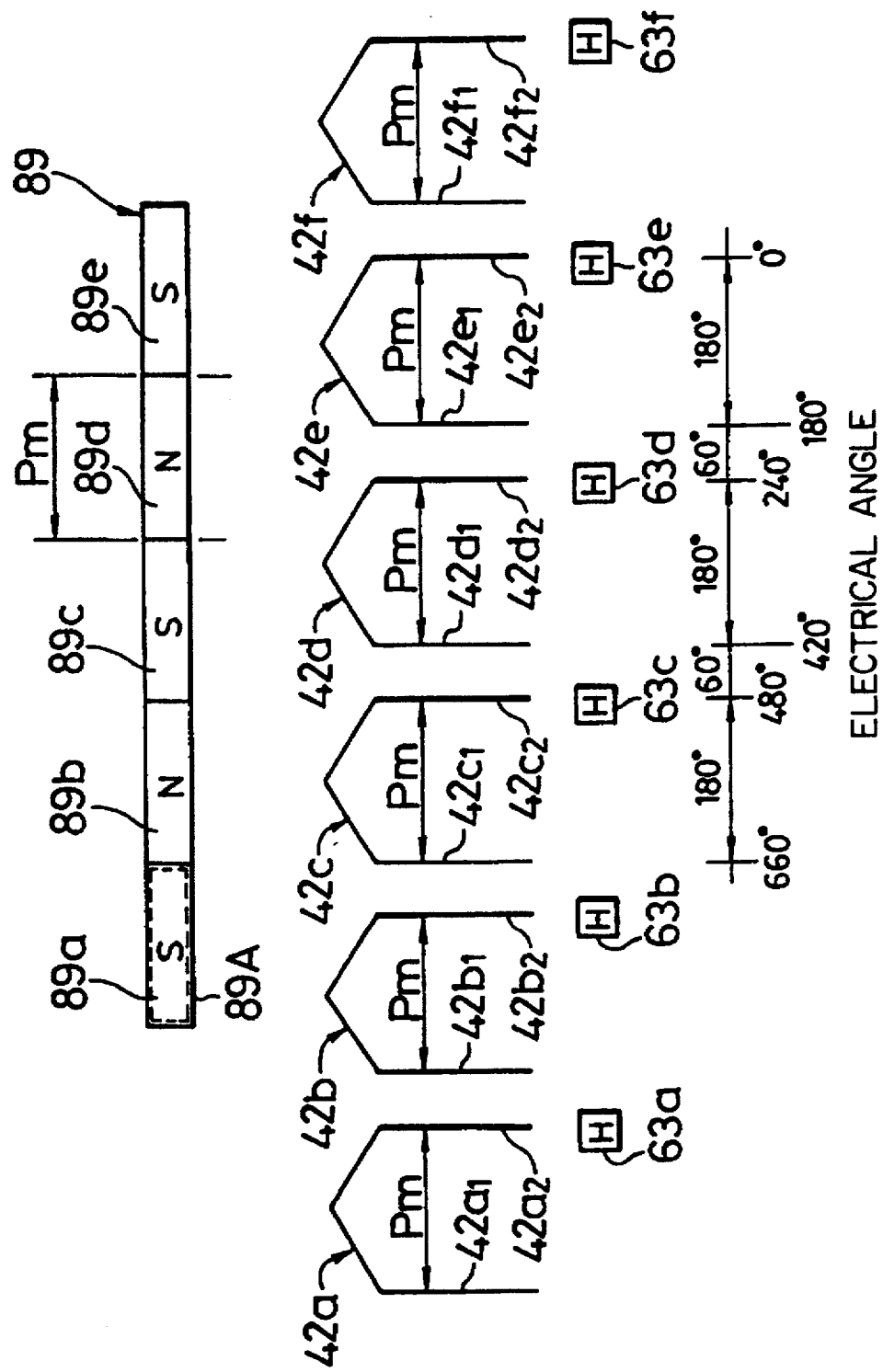

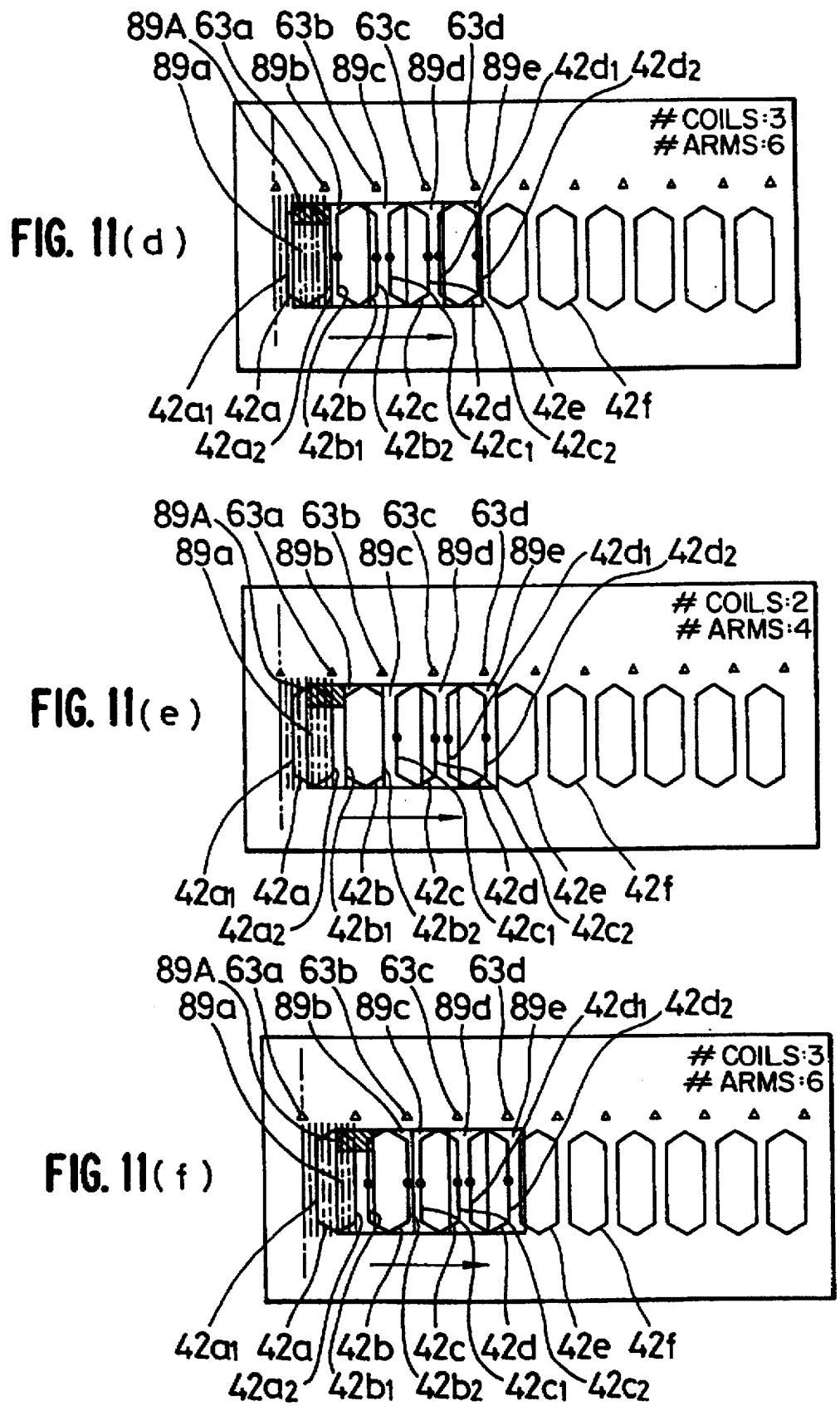

PRESENT INVENTION

LINEAR DIRECT CURRENT MOTOR

BACKGROUND OF THE INVENTION

1. Field of the Invention

The present invention relates to a linear direct current motor commonly used for moving an object to be moved with high accuracy in, for example, a motion mechanism such as a machine tool or industrial robot, and more particularly, to a brushless type of linear direct current motor.

2. Description of the Prior Art

FIG. 1 shows a drive unit containing a linear direct current motor of the prior art. Furthermore, this drive unit has a guide unit for guiding an object added to a linear direct current motor.

As shown in the drawing, this drive unit has a long base member 1 and moving body 2 that moves along said base member 1. More specifically, a plurality of rollers (not shown) are provided on moving body 2, and these rollers roll over a track (not shown) formed along the lengthwise direction in base member 1.

On the other hand, the linear direct current motor that composes a drive unit together with the above-mentioned guide unit is composed in the manner described below.

Said linear direct current motor is composed of a primary side, equipped with a large number of armature coils 5 arranged in a row in the lengthwise direction of base member 1 on said base member 1, and a secondary side, having a field magnet 6 (see FIG. 2) attached to the bottom surface of moving body 2 so as to oppose each of said armature coils 5. As shown in the drawing, said field magnet 6 is magnetized so that a plurality, in this case 4, of N and S magnetic poles are alternately arranged in a row along direction P in which moving body 2 is to move, namely the lengthwise direction of base member 1. Furthermore, as shown in FIG. 2, if the width of one magnetic pole of field magnet 6 is taken to be Pm in this example, the open angle width of each armature coil 5 is set to the same Pm, and the interval of the armature coils is set to Pm/3.

In the linear direct current motor of the above-mentioned constitution, by supplying a prescribed excitation current to armature coils 5, thrust is generated based on Fleming's left hand rule between the primary and secondary sides. For example, if base member 1, to which the primary side is coupled, is taken to be the stationary side, moving body 2, integrated into a single unit with the secondary side, is moved by this thrust.

However, in the linear direct current motor as described above, it is important to systematically supply an excitation current to each armature coil to maintain as constant a thrust as possible regardless of changes in the position of the primary side with respect to the secondary side. Continuing, the following provides an explanation of the constitution pertaining to this supply of power.

As shown in FIGS. 3(a) through 3(i), magnetic pole discrimination elements in the form of Hall effect elements 8a through 8e are respectively arranged in the vicinity of each armature coil 5a through 5e (these five armature coils are mutually distinguished by adding small letters of the alphabet from a through e to reference numeral 5 indicating armature coils in the explanation thus far for the sake of convenience in the explanation). In this example, each of Hall effect elements 8a through 8e is arranged corresponding to conductors $5a_2$ through $5e_2$ on one side among the conductors (arms) that contribute to thrust possessed on two sides by each armature coil 5a through 5e. These Hall effect elements 8a through 8e emit a signal (in the form a potential difference) corresponding to the lines of magnetic force emitted by each magnetic pole possessed by field magnet 6 when said field magnet 6 approaches. Electrical power is then supplied to the armature coil corresponding to the Hall effect element that emitted said signal based on that signal. Alternatively, this supply of electrical power is interrupted to the armature coil corresponding to a Hall effect element for which said signal has yet to be obtained or is no longer being obtained, thus enabling control to be performed.

Control of the supply of electrical power is performed in the manner described below based on said constitution.

FIGS. 3(a) through 3(i), show the various positions of the field magnet 6.

To begin with, in the case field magnet 6 is located at the position shown in FIG. 3(a), since each of magnetic poles 6b and 6c of said field magnet 6 acts on two Hall effect elements 8a through 8b, the two armature coils 5a and 5b that respectively correspond to these Hall effect elements are supplied with electrical power. Furthermore, although operation after this point is similar, the Hall effect elements that act on the respective boundaries of each magnetic pole (6a and 6d) do not operate. In this state, all conductors, which are possessed on two sides each by each of said armature coils 5a and 5b, contribute to thrust, and these conductors consist of conductors $5a_1$, $5a_2$, $5b_1$ and $5b_2$. These are indicated with a circle in FIG. 3(a) through 3(i). Thrust is generated since these four conductors act on magnetic poles 6a, 6b and 6c of field magnet 6. Furthermore, since conductors $5c_1$ and $5c_2$ of the other armature coil 5c act on the boundary between corresponding magnetic poles of field magnet 6, thrust is not generated even though power is supplied to armature coil 5c.

Next, as shown in FIGS. 3(a) through 3i), in the case the open angle width of the armature coils is taken to be Pm, the interval between the armature coils is taken to be Pm/3, and this is divided into 8 divisions, when field magnet 6 is the position shown in FIG. 3(b), namely when moved by ⅛, since each of magnetic poles 6a through 6d of said field magnet 6 acts on three Hall effect elements 8a through 8c, three armature coils 5a through 5c, which respectively correspond to these Hall effect elements, are supplied with electrical power. In this state, conductors possessed on two sides each by each of said armature coils 5a, 5b and 5c all contribute to thrust, and consist of the six conductors $5a_1$, $5a_2$, $5b_1$, $5b_2$, $5c_1$, and $5c_2$. These are indicated with a circle in FIGS. 3(a) through 3(i). Thrust is generated since these six conductors act on magnetic poles 6a, 6b, 6c and 6d of field magnet 6.

Thus, when field magnet 6 is at each of the positions shown in FIGS. 3(c) through electrical power is continued to be supplied to the prescribed armature coils in the same manner as described above. FIG. 12(a) illustrates the relationship with coil drive current based on the number of coils and the number of arms obtained in this manner.

Although the above-mentioned linear direct current motor of the prior art operates by supplying excitation current to each of the armature coils as described above, it has the problem described below.

Namely, when the field magnet is located at the position shown in FIG. 3(a), thrust is actually generated by four of the conductors that contribute to thrust possessed by each armature coil as previously described. However, the number of conductors (arms) that generate thrust changes when field magnet 6 is moved to the above-mentioned other positions of FIGS. 3(b) through 3(i) namely being 6, 4, 5, 3, 5, 3, 5 and 4 conductors, respectively. Thus, a constant level of thrust cannot be obtained at all times due to the wide range of variation. This is clear from FIG. 12(a).

SUMMARY OF THE INVENTION

In consideration of the above-mentioned problem of the prior art, the object of the present invention is to provide a linear direct current motor able to maintain a constant level of thrust at all times regardless of changes in the relative positions of the primary and secondary sides. In addition, the object of the present invention is to provide a linear direct current motor that is able to achieve the above-mentioned object with a simple constitution.

The linear direct current motor according to the present invention is equipped with: a field magnet in which P number of poles (P being an integer of at least 2) are arranged and magnetized so that they are sequentially different; a group of armature coils wound so that the open angle width of the conductors contributing to thrust is roughly 2n−1 times (where n is an integer of at least 1) the magnetic pole width of said field magnet, which relatively drive said field magnet by being arranged so as to oppose said field magnet and supplying excitation current by an excitation current supply circuit; and, magnetic pole discrimination elements, provided corresponding to each said armature coil, which perform discrimination of the magnetic poles of said field magnet; wherein, the endmost magnetic poles of said field magnet are non-detected magnetic poles with respect to said magnetic pole discrimination elements, and said excitation current supply circuit is composed so that current output to the armature coils has constant current properties.

In the linear direct current motor as claimed in the present invention, since the endmost magnetic poles of the field magnet are non-detected magnetic poles with respect to magnetic pole discrimination elements, the magnitude of changes in the number of conductors of the magnetic coils that generate thrust can be reduced regardless of changes in the relative positions of the primary and secondary sides, and changes in thrust can be further reduced by controlling the drive current to a constant current, thus minimizing thrust ripple.

BRIEF DESCRIPTION OF THE DRAWINGS

FIGS. 3(a) through 3(i) are explanatory drawings of the operation of the linear direct current motor contained in the drive unit shown in FIG. 1.

FIG. 10 is a conceptual drawing of the constitution of the linear direct current motor contained in the drive unit shown in FIGS. 4 through 6.

FIGS. 11(a) through 11(i) are explanatory drawings of the operation of the linear direct current motor contained in the drive unit shown in FIGS. 4 through 6.

DESCRIPTION OF THE PREFERRED EMBODIMENTS

The following provides an explanation of a drive unit containing a linear direct current motor as claimed in the present invention with reference to the drawings. Furthermore, this linear direct current motor is of the moving magnet type.

Said drive unit is composed by mutually combining a guide unit, which supports an object to be moved and guides said object with high accuracy, and a linear direct current motor, which functions as a driving device that drives said guide unit.

To begin with, the following provides an explanation of the above-mentioned guide unit.

Figure 1:
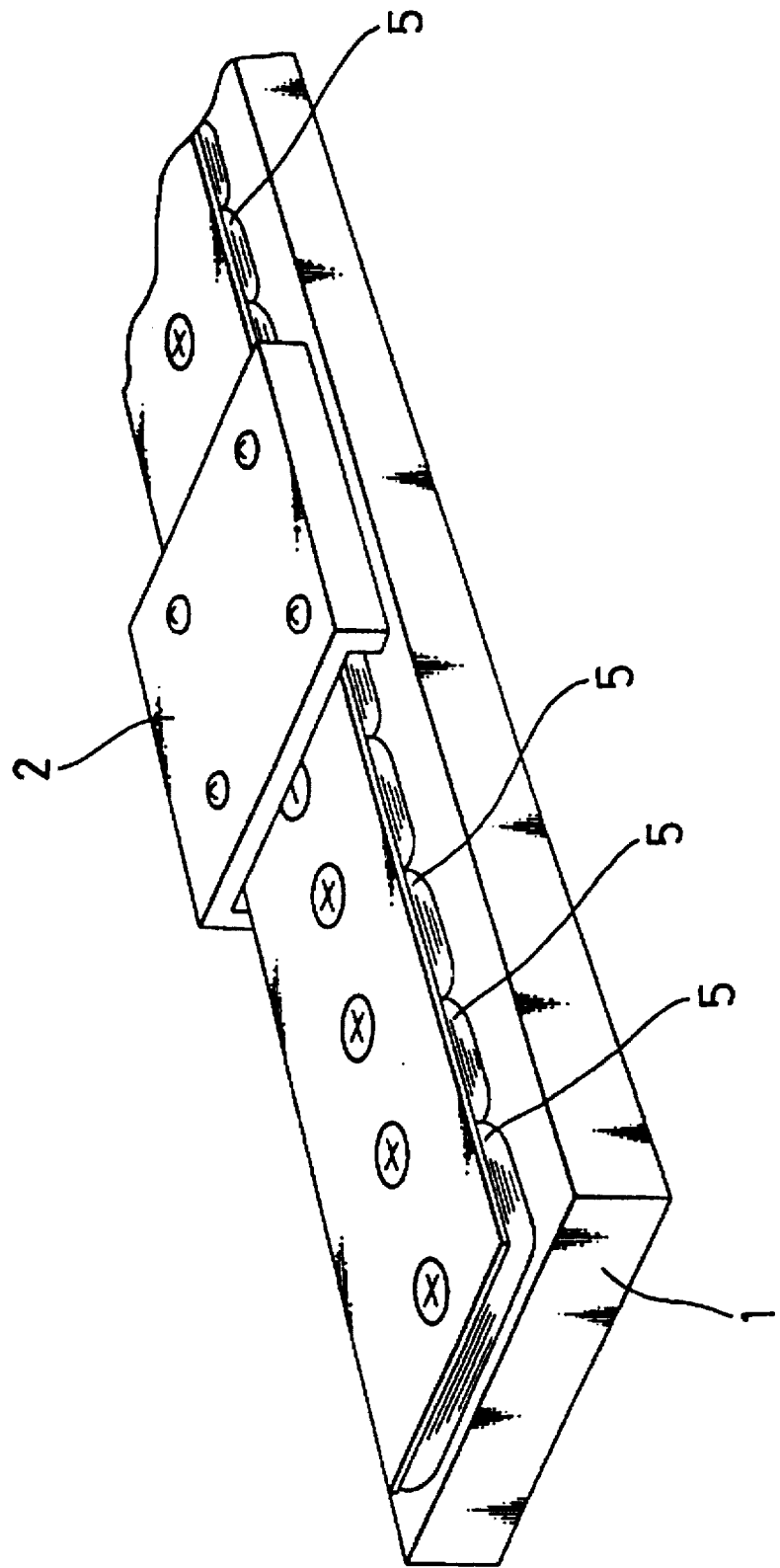
FIG. 1 is a perspective view of a portion of a drive unit containing a linear direct current motor of the prior art.
Figure 2:
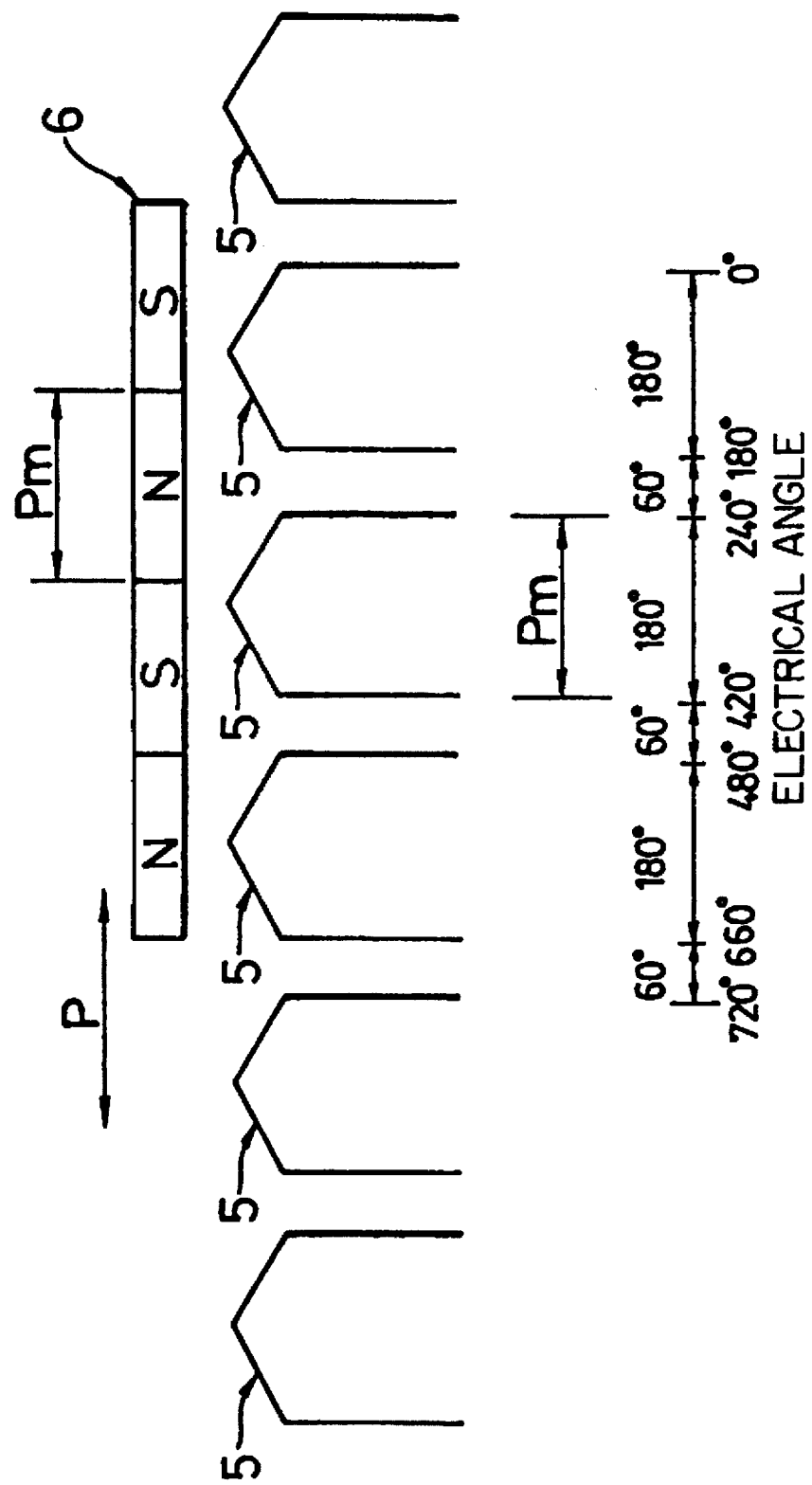
FIG. 2 is a conceptual drawing of the constitution of the linear direct current motor contained in the drive unit shown in FIG. 1.
Figure 3A:
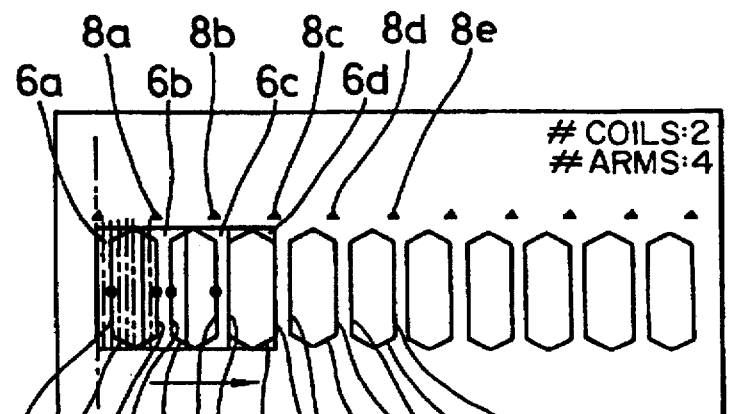
Figure 3B:
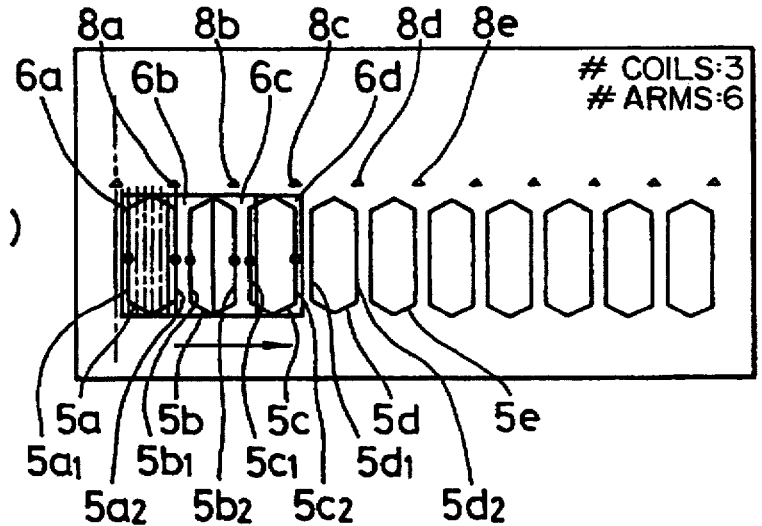
Figure 3C:
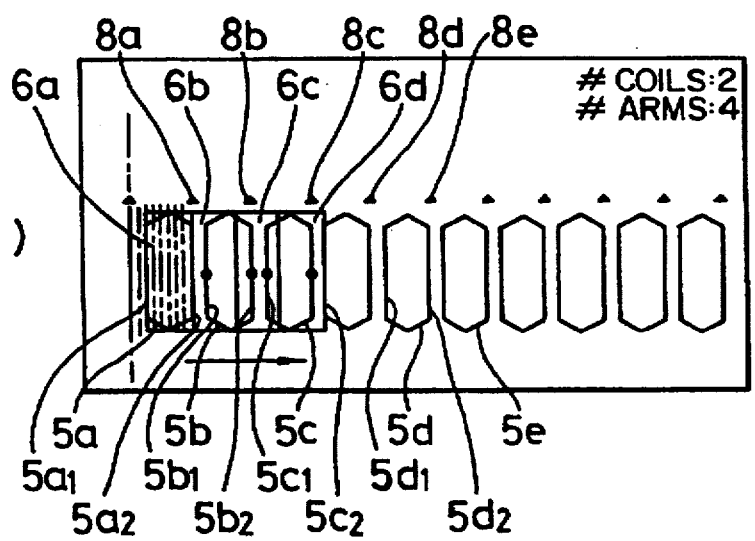
Figure 3D:
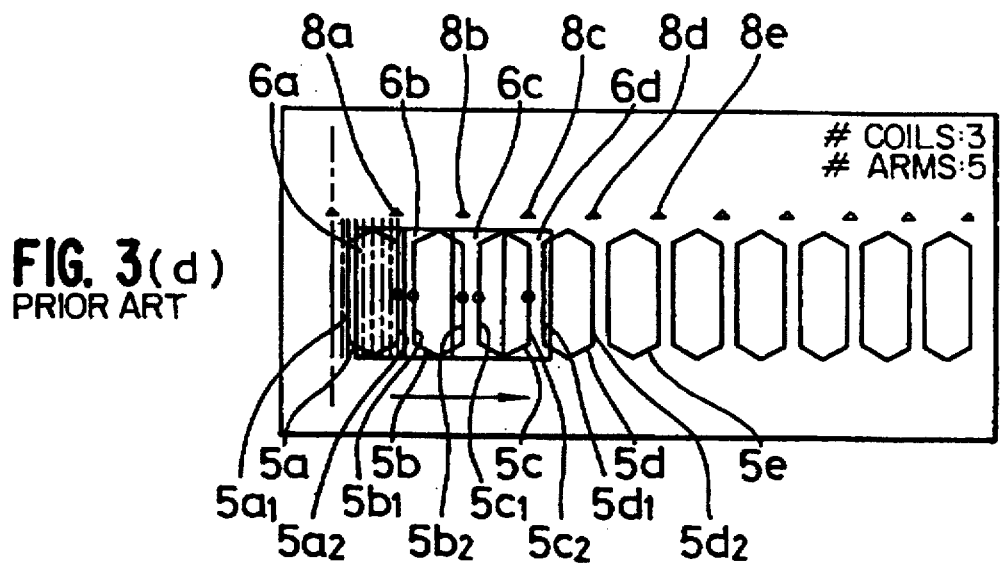
Figure 3E:
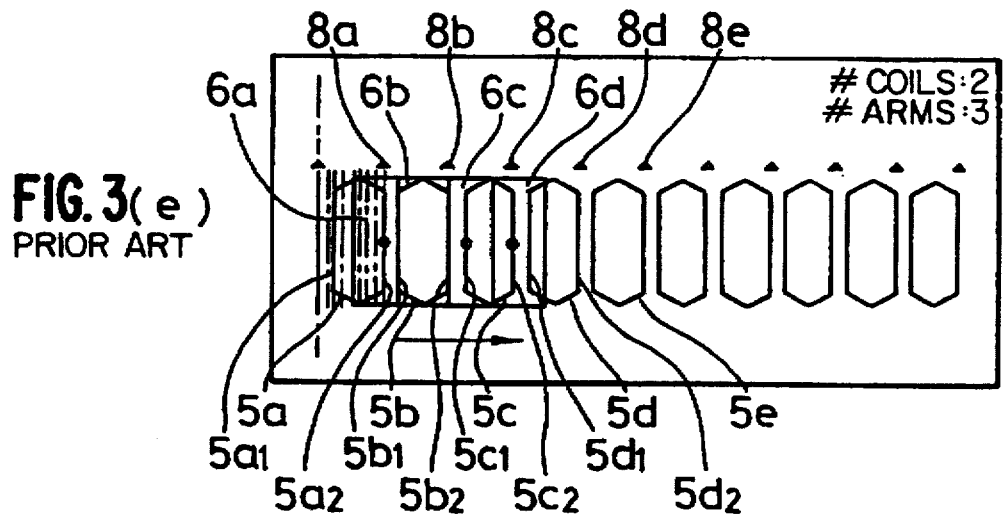
Figure 3F:
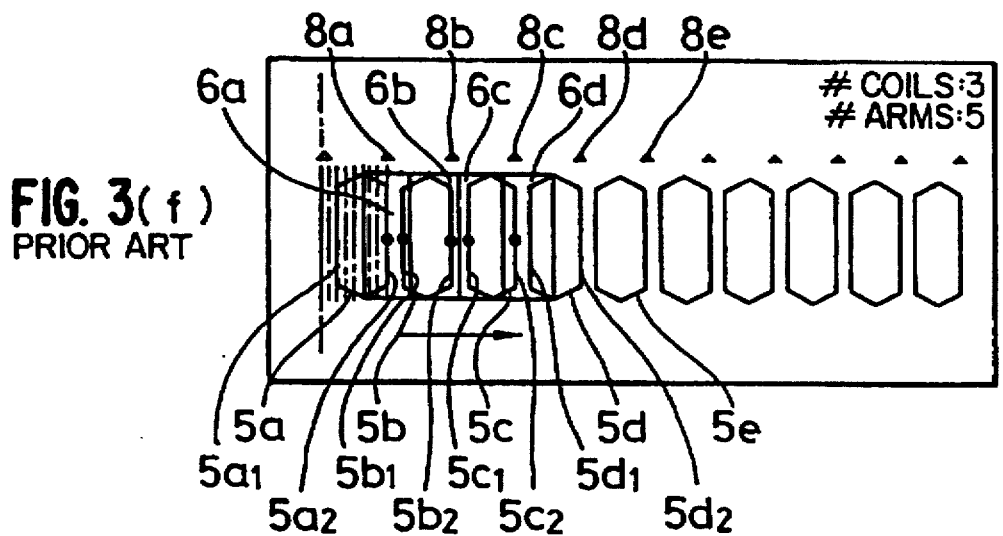
Figure 4:
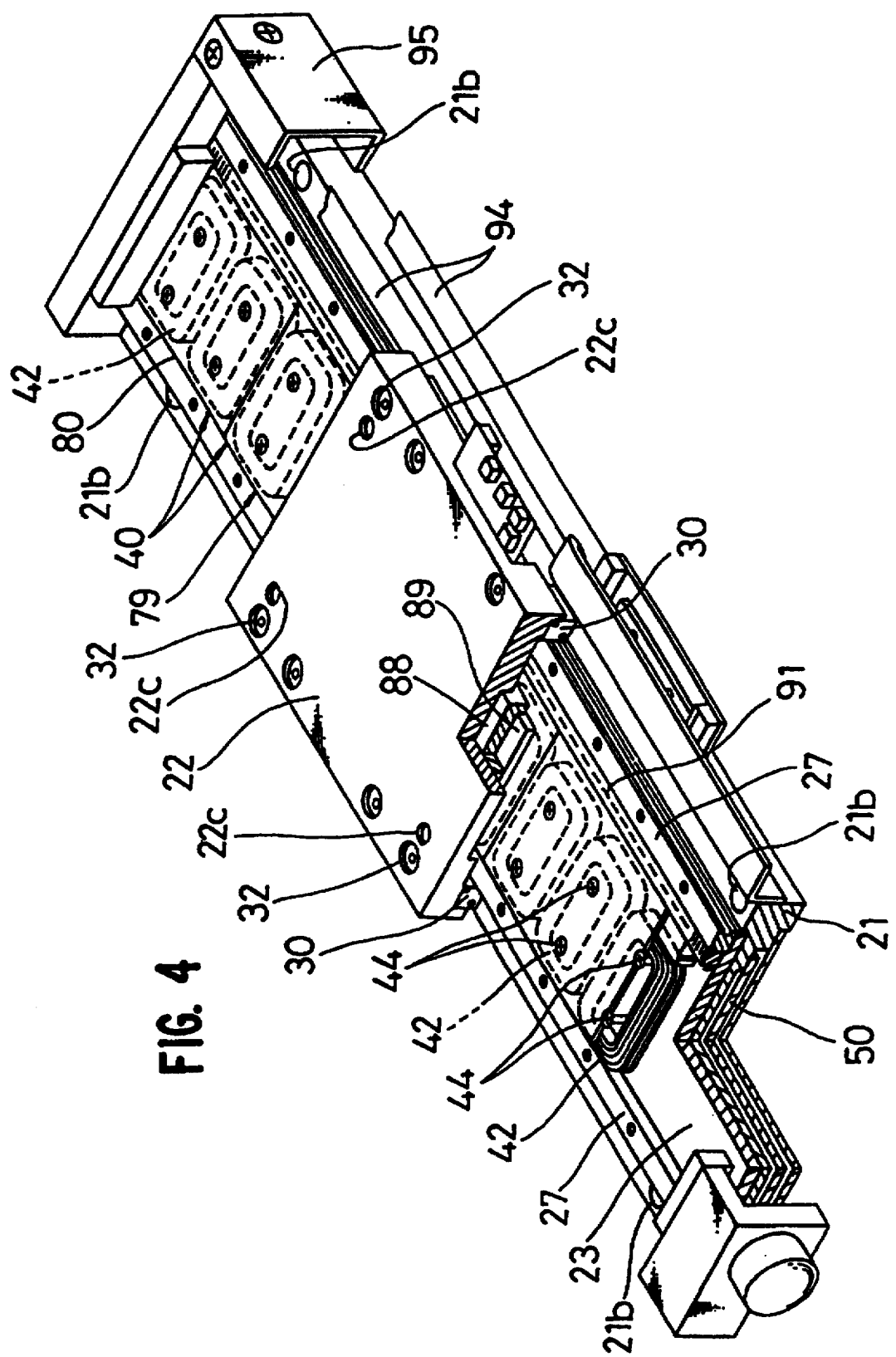
FIG. 4 is a perspective view, including a partial cross-section, of a drive unit containing a linear direct current motor as an embodiment of the present invention.
Figure 5:
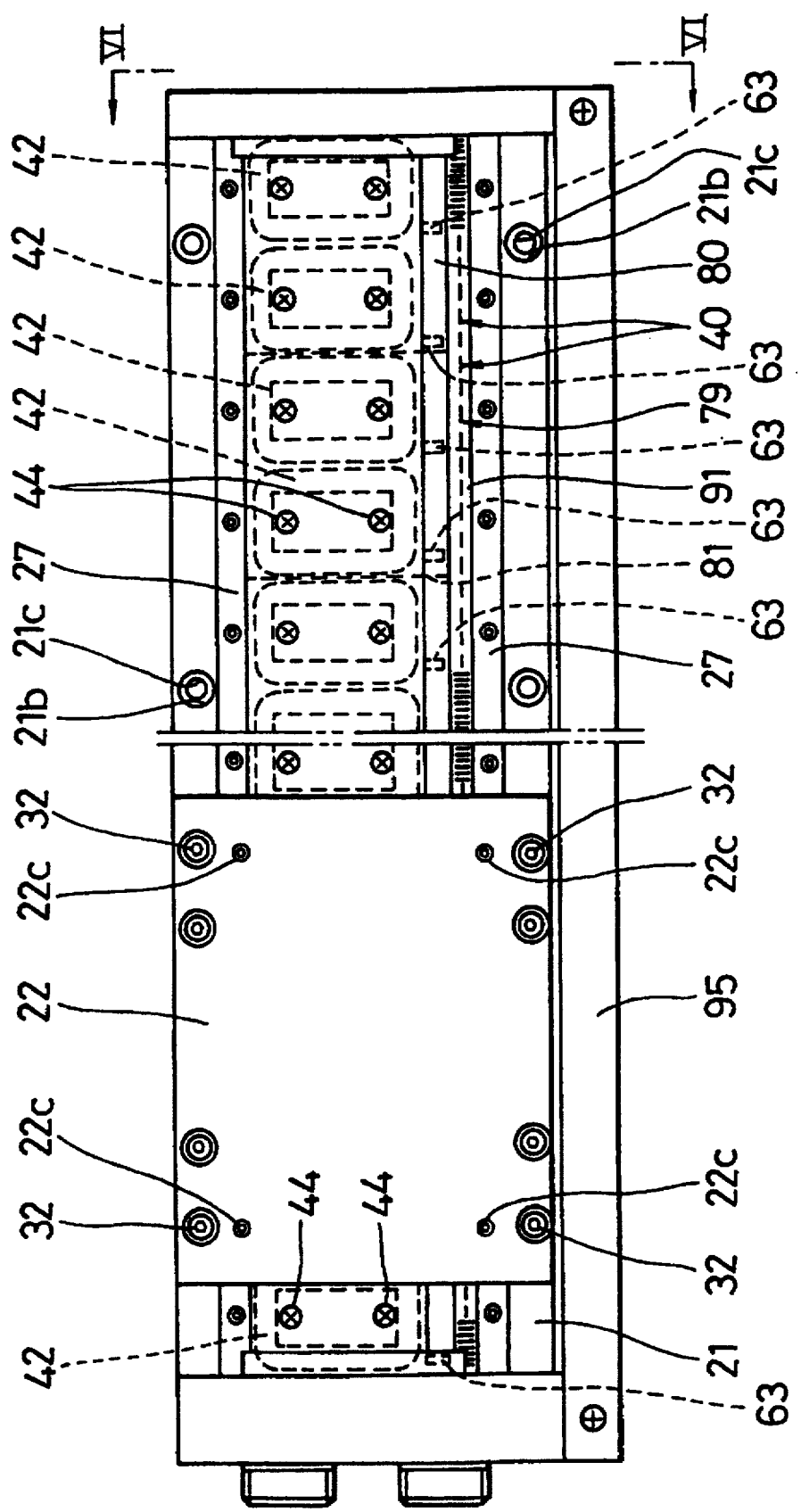
FIG. 5 is an overhead view of the drive unit shown in FIG. 4.
Figure 6:
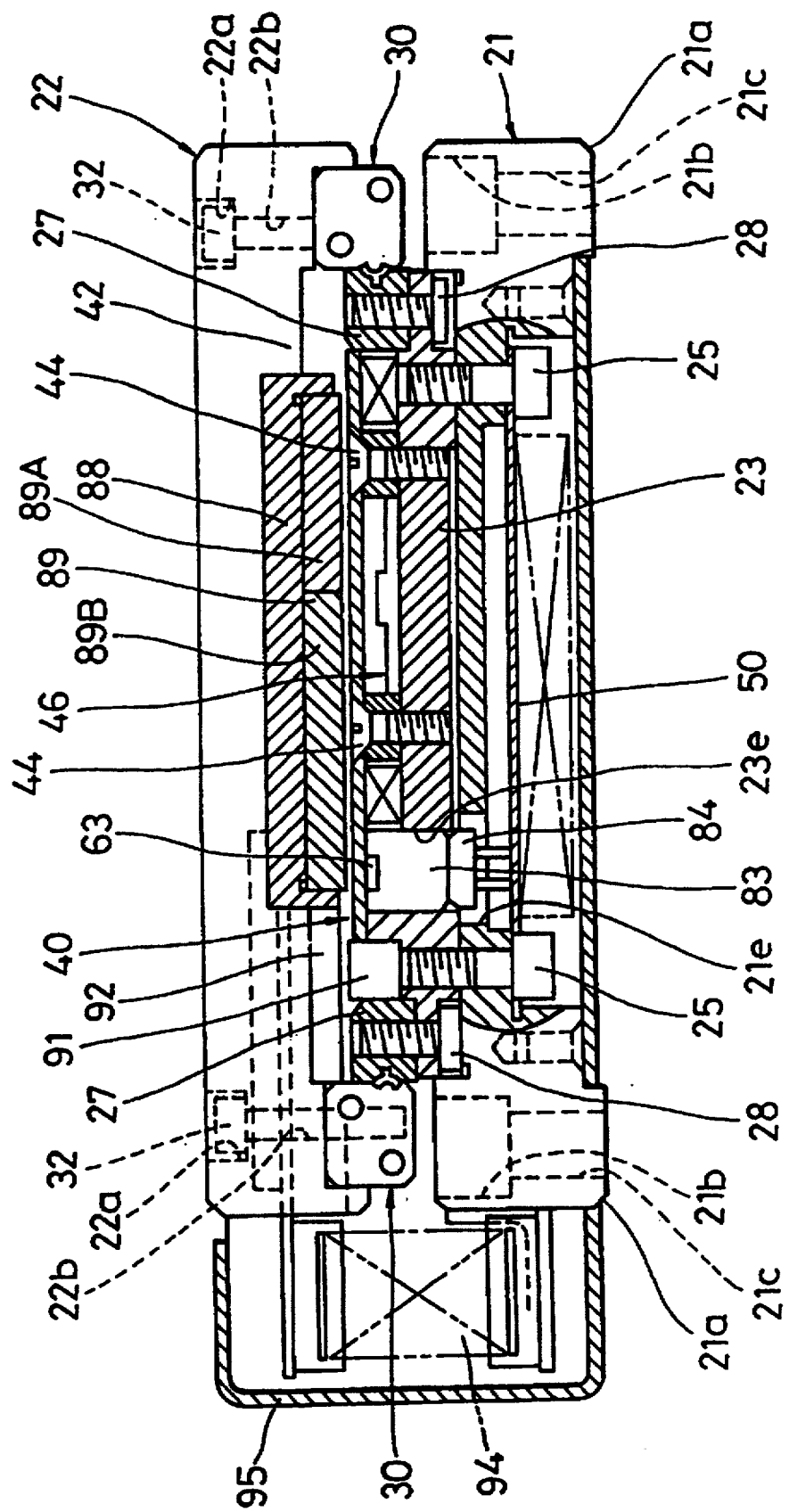
FIG. 6 is a view, including a partial cross-section, taken along arrows VI—VI relating to FIG. 5.

As shown in FIGS. 4 through 6, this guide unit has bed 21 formed roughly into the overall shape of, for example, a rectangular plate, and table 22 to move along the lengthwise direction of said bed 21. As shown in FIGS. 4 and 6, coil yoke 23, formed into roughly into the shape of a rectangular plate and having nearly the same length as bed 21, is arranged on the upper surface of said bed 21, and is fastened to said bed 21 by a plurality of bolts (with hexagon sockets, see FIG. 6) 25.

Two track rails in the form of track rails 27 are arranged on both sides of the upper surface of said coil yoke 23 along the lengthwise direction of said coil yoke and are fastened to said coil yoke 23 by a plurality of flat head screws 28 (see FIG. 6).

Figure 7:
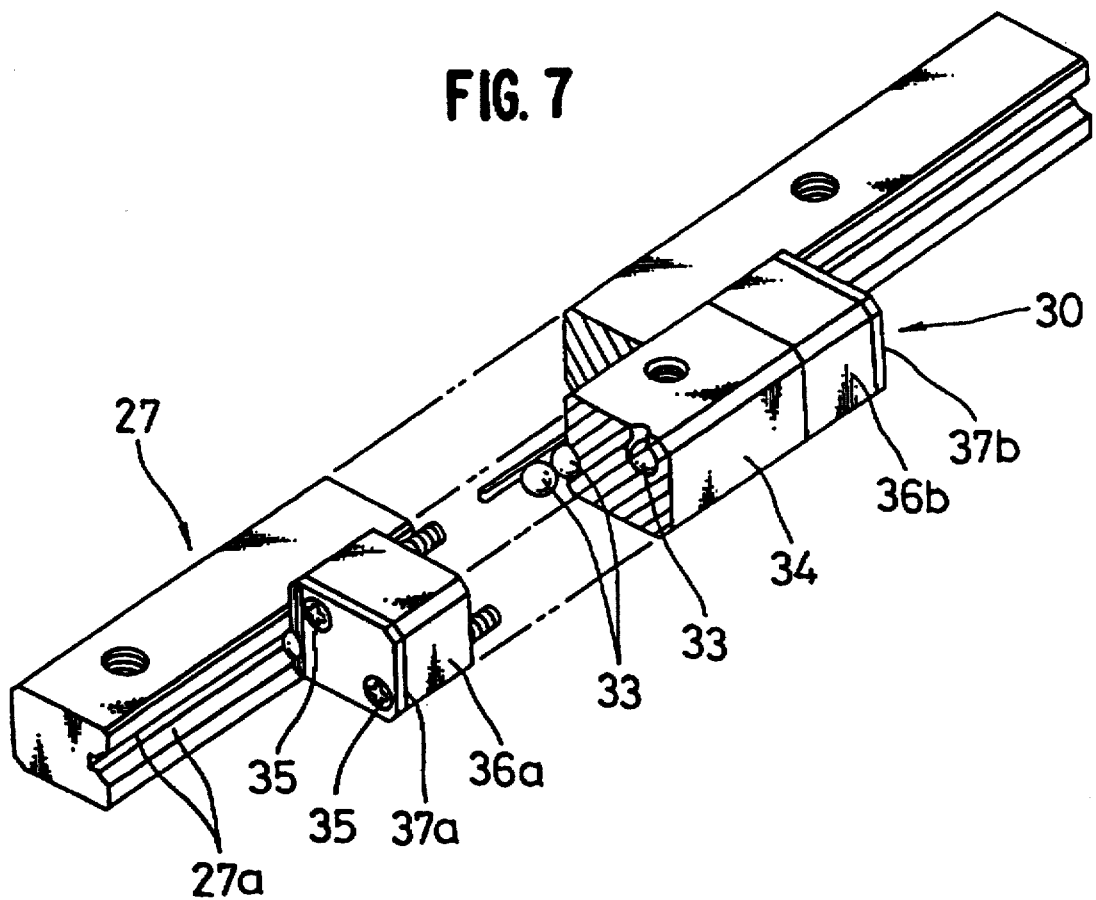
FIG. 7 is a perspective view, including a partial cross-section, of a track rail and slide member equipped on the drive unit shown in FIGS. 4 through 6.

As shown in FIG. 7, a track in the form of a single track groove 27a, having a roughly semi-circular shaped cross-section, is formed in the outside of the above-mentioned track rail 27. As is clear from FIGS. 4 and 6, a slider in the form of slide member 30, able to freely perform relative motion with respect to said track rail 27, is arranged on the outside of said track rail 27, and is fastened to the lower surface of table 22 by, for example, two bolts (with hexagon heads) 32. Furthermore, as shown in FIG. 6, countersunk portions 22a and insertion holes 22b are formed in table 22 into which the head portions and threaded portions, respectively, of bolts 32 are inserted. Bolts 32 are embedded in these countersunk portions 22a and insertion holes 22b, and do not protrude from the upper surface of table 22.

A rolling element circulating path (not shown) is formed in the above-mentioned slide member 30, and rolling elements in the form of a large number of balls 33 are arranged and contained within said rolling element circulating path. These balls 33 bear the load between track rail 27 and slide member 30 by circulating while rolling over track groove 27a of track rail 27 accompanying movement of slide member 30 with respect to track rail 27.

As shown in FIG. 7, the above-mentioned slide member 30 has casing 34, a pair of end caps 36a and 36b coupled to both ends of said casing 34 by round head screws 35, and two seals 37a and 37b fastened to the outer surfaces of both of said end caps 36a and 36b. The above-mentioned rolling element circulating path is composed of a load bearing track groove and return path formed in casing 34 mutually in parallel and passing linearly through said casing 34, and a pair of roughly arc-shaped direction changing paths formed in both end caps 36a and 36b that connect both ends of said load bearing track groove and return path. Furthermore, said load bearing track groove opposes track groove 27a of track rail 27.

Figure 8:
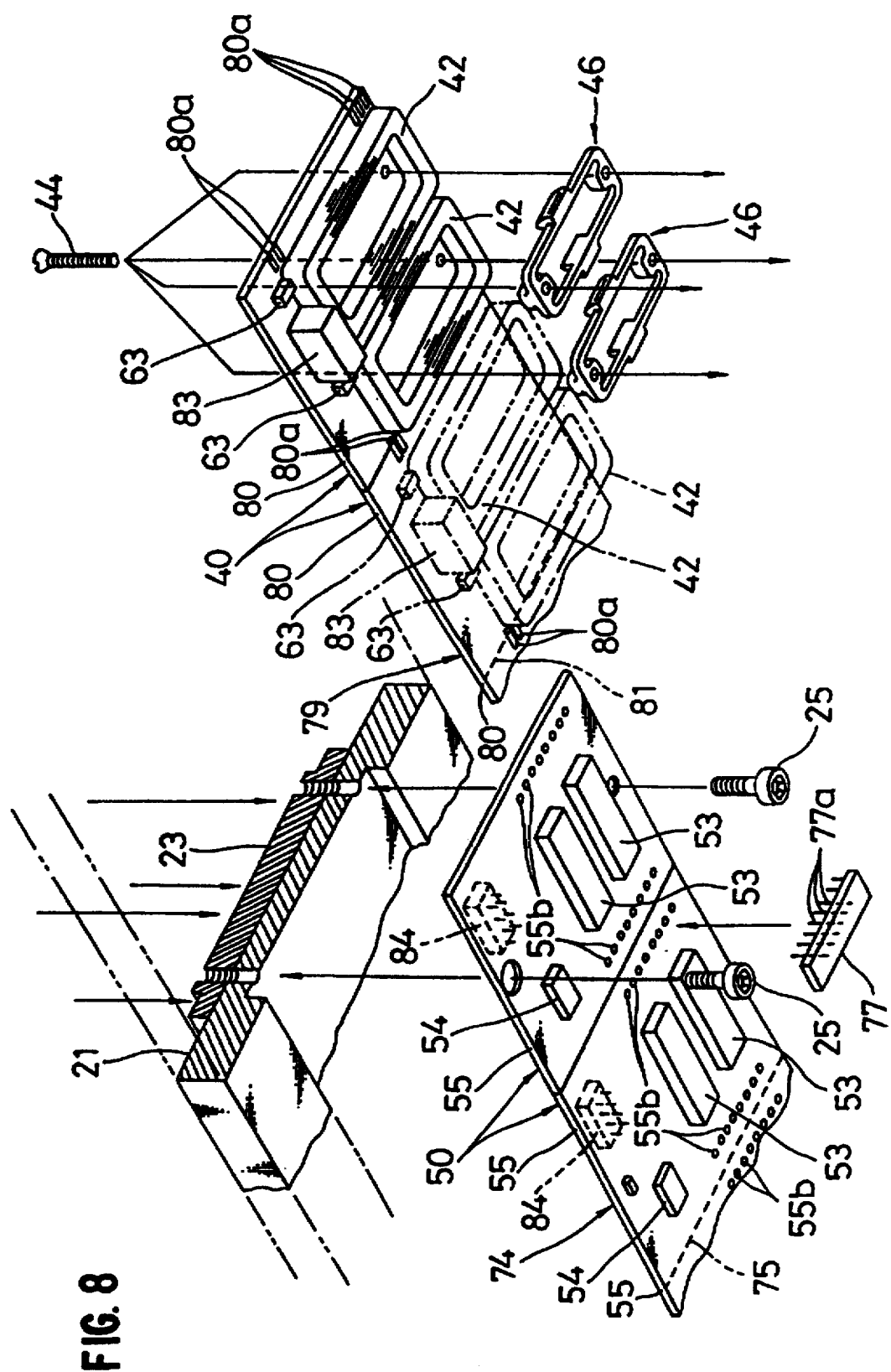
FIG. 8 is an exploded perspective view, including a partial cross-section, of the essential portion of the linear direct current motor contained in the drive unit shown in FIGS. 4 through 6.

The guide unit of the constitution described above is fastened to a flat mounting surface equipped on, for example, a machine tool (not shown) by a plurality of bolts (with hexagon sockets: not shown). Consequently, as shown in FIG. 6, bed 21 has flat mounting bottom surface 21a for anchoring said bed 21 to said mounting surface. As shown in FIGS. 6 through 8, countersunk portions 21b and insertion holes 21c are formed in both sides of bed 21 into which the head portions and threaded portions of the above-mentioned bolts for fastening said bed are respectively inserted. Said bolts are embedded in these countersunk portions 21b and insertion holes 21c, and do not protrude from the upper surface of bed 21. In addition, as shown in FIGS. 4 and 5, for example, four threaded holes 22c are formed in the four corners of the upper surface of table 22 able to move with respect to this bed 21, and a table (not shown) equipped on an apparatus on which said drive unit is equipped is fastened to said table 22 by bolts (not shown) screwed into these threaded holes 22c.

Continuing, the following provides a detailed description of the primary and secondary sides of the linear direct current motor that is mutually combined with the guide unit having the constitution described above.

To begin with, as shown in FIGS. 4 through 6 and 8, the primary side has the previously described coil yoke 23 installed on bed 21, coil substrate 40 arranged along the lengthwise direction of said coil yoke 23 on the upper surface of said coil yoke 23, and, for example, fourteen armature coils 42 supported by being affixed in a row along the direction in which the above-mentioned table 22 is to move on the lower surface of said coil substrate 40, namely the side of coil yoke 23. Furthermore, each armature coil 42 is wound into roughly the shape of a rectangular loop. In addition, as shown in FIGS. 5, 6 and 8, Hall effect elements 63 are provided corresponding to each armature coil 42 on coil substrate 40.

Each of the above-mentioned armature coils 42 and coil substrate 40 are fastened together to coil yoke 23 with said coil substrate 40 on the outside by fastening members in the form of countersunk head screws 44, two each, for example, of which are inserted for each of said armature coils 42.

As shown in FIGS. 6 and 8, spacer assemblies 46 are juxtaposed between coil substrate 40, fastened by countersunk head screws 44, and coil yoke 23 into which said countersunk head screws 44 are screwed. These spacer assemblies 46 are provided so that deformation, such as warping and so forth, does not occur in coil substrate 40 caused by tightening of countersunk head screws 44, and are fit inside each armature coil 42.

Next, the following provides an explanation of the circuit substrate for performing supply of electricity and so forth to each of the above-mentioned armature coils 42.

As shown in FIGS. 4, 6 and 8, circuit substrate 50 is arranged in parallel with coil substrate 40 on the lower surface of bed 21 on which said coil substrate 40 is installed on its upper surface with coil yoke 23 in between. Moreover, said circuit substrate 50 is fastened to said bed 21 by a plurality of bolts (with hexagon sockets) 25. Furthermore, these bolts 25 serve to fasten the above-mentioned coil yoke 23 to bed 21.

As shown in FIG. 8, the above-mentioned circuit substrate 50 is composed by joining together a plurality of separate portions 55, each provided with a drive circuit composed of electronic components 53, 54 and so forth. These separate portions 55 are provided corresponding to each unit of two armature coils each of the fourteen armature coils 42 provided in a row. Thus, the number of these separate portions 55, in this case, is seven.

The drive circuit provided on each of the above-mentioned separate portions 55 contains one set of circuit portions supplying excitation current to one armature coil 42, or in other words, a circuit corresponding to two armature coils 42.

Continuing, the following provides a detailed description of the separated constitution of the above-mentioned circuit substrate 50 and coil substrate 40 arranged above it.

To begin with, the following provides an explanation of circuit substrate 50.

In the case of fabricating this circuit substrate 50, a base substrate 74, having a base length (a portion is shown in FIG. 8), is made available. This base substrate 74 is composed of, for example, six separate portions 55, explained based on FIG. 8, joined into a single unit. As was previously described, these separate portions 55 are provided with a drive circuit that performs supply of electrical power and so forth to two armature coils 42 each grouped in the form of individual units. Furthermore, as shown in FIG. 8, marks in the form of broken lines 75 are printed on both the top and bottom surfaces of base substrate 74 (only those on the bottom surface are shown in the drawing) for distinguishing each separate portion 55.

Since the previously described circuit substrate 50 must link together seven of the above-mentioned separate portions 55, said circuit substrate 50 is completed by severing one of the six separate portions 55 possessed by the above-mentioned base substrate 74 along the above-mentioned broken line 75 to separate, arranging this separated separate portion 55 in a row at one end of unseparated base substrate 74 as shown in FIG. 8, and mutually connecting their corresponding connection terminals.

Furthermore, in FIG. 8, connection between the above-mentioned separated separate portions 55 and base substrate 74 is performed, for example, by a single connection component 77 having terminals 77a fit into through holes 55b provided at the portion of both connection terminals. Furthermore, although connection between corresponding connection terminal portions may be performed using copper wire and so forth, by performing connection using this type of connection component 77, in addition to connection being able to be performed all at once, connections are reinforced due to the rigidity of said connection component 77. In addition, besides using components that simply act to make electrical connections, electronic components such as IC and so forth may also be used for connection component 77.

The following provides an explanation of coil substrate 40.

Although the overall coil substrate 40 is not shown, in the case of fabricating this coil substrate 40, a base substrate 79 of a length nearly equal to base substrate 74 for the above-mentioned circuit substrate 50 is made available as shown in FIG. 8. This base substrate 79 is composed by linking together six separate portions 80 into a single unit in the same manner as base substrate 74 for circuit substrate 50. As shown in the drawing, two armature coils 42 each are affixed, grouped together in units, on these six separate portions 80, thus making the total number of armature coils 42 arranged in a row on base substrate 79 twelve. Furthermore, as shown in FIGS. 8 and 5, marks in the form of broken lines 81 are printed on the top and bottom surfaces of base substrate 79 to distinguish these separate portions 80. As shown in FIG. 8, coil substrate 40 is formed by joining and connecting a single separate portion 80 separated from another base substrate not shown to one end of this unseparated base substrate 79. Furthermore, in FIG. 8, reference numeral 80a indicates connection terminals provided on each separate portion 80.

Furthermore, in the description thus far, although two armature coils 42 each and a drive circuit for driving said armature coils 42 are separated into units with respect to coil substrate 40 and circuit substrate 50, three or more armature coils and their drive circuit may also be separated into their respective units. In addition, although base substrate 74, which supports twelve armature coils 42, and base substrate 79, on which a plurality of drive circuits are arranged in a row corresponding to two of these armature coils 42 each, are made available during fabrication of the drive unit equipped with a total of fourteen armature coils 42 in the present embodiment, it is only natural that the setting of the total length of these base substrates 74 and 79, namely the numbers of armature coils and drive circuits to be equipped on these, can be suitably changed.

In addition, although coil substrate 40 and circuit substrate 50 are composed by separating at least one of separate portions 55 and 80 provided on base substrates 74 and 79, and joining it to unseparated base substrates 74 and 79 in the present embodiment, in the case the operating stroke of the drive unit to be fabricated is shorter than the total length of base substrates 74 and 79, at least one of each of separate portions 55 and 80 provided on each of said base substrates 74 and 79 should be cut away as necessary. Thus, a substrate of desired length can be easily obtained by cutting off one separated portion from the base substrate and joining to another unseparated base substrate, or simply removing a portion of the base substrate. In addition, the remaining portion of the base substrate from which a portion has been cut away as mentioned above can also be used in other applications in any state.

As shown in FIGS. 6 and 8, coil substrate 40 and circuit substrate 50, which are arranged to be mutually separated by bed 21 and coil yoke 23, are connected by connecting a plurality, in this case seven, of connection devices in the form of both corresponding male and female connectors 83 and 84 provided on mutually opposing sides of both said substrates. One each of these connectors 83 and 84 is arranged with respect to each separate portion 55 and 80 each provided with two armature coils 42 and their drive circuit grouped into a unit as previously described. As shown in FIG. 8, said connectors 83 and 84 are mutually connected through apertures 21e and 23e formed in bed 21 and coil yoke 23. Thus, since one each of connectors 83 and 84 is provided for each of separate portions 55 and 80 of coil substrate 40 and circuit substrate 50, when mutually assembling both said separate portions 55 and 80, the directions of both can be recognized both quickly and easily, thus facilitating assembly work. Furthermore, connection of corresponding separate portions 55 and 80 may be performed by lead wires and not by connectors as described above. In addition, with respect to the number of connectors, besides providing only one connector for each of separate portions 55 and 80 as mentioned above, two or more connectors may also be provided.

On the other hand, the secondary side of the linear direct current motor is composed in the manner described below.

Figure 9:
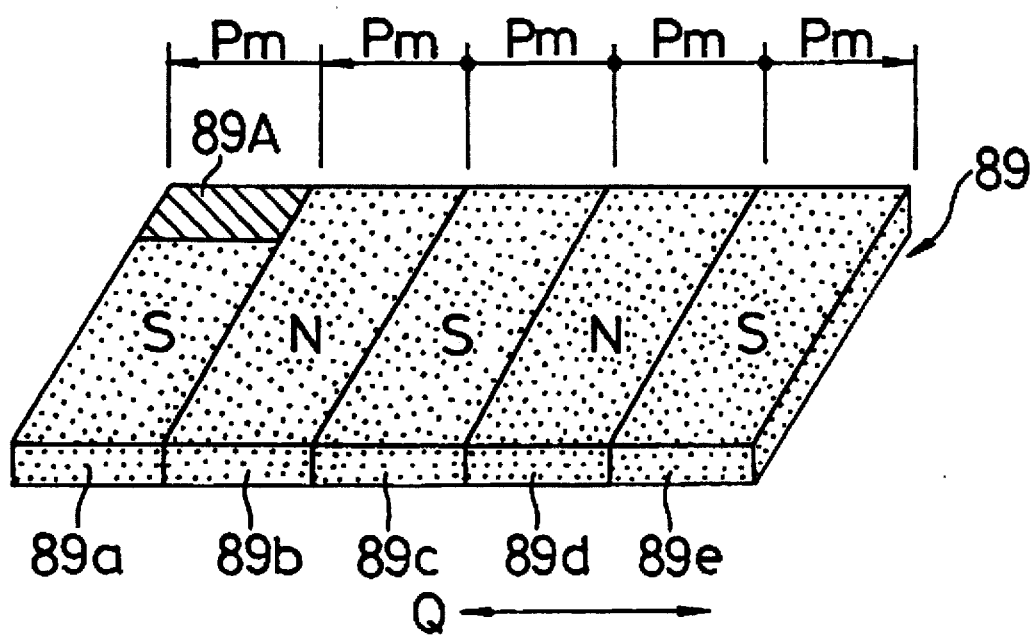
FIG. 9 is a perspective view of a field magnet that is one of the constituent members of the secondary side of the linear direct current motor contained in the drive unit shown in FIGS. 4 through 6.

As shown in FIGS. 4 and 6, said secondary side has magnet yoke 88, mounted on the lower side of table 22, and field magnet 89 anchored on the lower surface of said magnet yoke 88 to oppose each of the above-mentioned armature coils 42 of the primary side. As shown in FIG. 9, the overall shape of field magnet 89 is formed into roughly that of a rectangular plate, and a plurality of N and S magnetic poles, for example 5, are magnetized so as to be alternately arranged in a row along direction Q in which relative movement is performed by the primary and secondary sides, namely the lengthwise direction of bed 21. However, as shown in FIG. 9, only the surface that opposes the Hall effect element for position detection described later of, for example, magnetic pole S, which is one of the endmost magnetic poles, is either shielded with a non-magnetic material or is composed in the form of non-detected magnetic pole 89a formed with non-magnetic material 89A. Furthermore, said magnetic pole S may also be composed by cutting away a portion of non-magnetic material 89A of non-detected magnetic pole 89a.

In said drive unit, a position detection device having the constitution described below is provided for detection of the relative positions of the above-mentioned bed 21 and table 22.

Namely, said position detection device is composed of linear magnetic scale 91 shown in FIGS. 4 through 6, and magnetic sensor portion 92 shown in FIG. 8. Said linear magnetic scale 91 extends in the direction of movement of the above-mentioned table 22, and together with a large number of N and S magnetic poles being alternately magnetized at a precise pitch along its lengthwise direction, an origin signal magnetized portion is formed on one end. On magnetic sensor portion 92, together with providing a Hall effect element for origin detection, another two Hall effect elements for the A and B phases are arranged mutually shifted by ½ the above-mentioned pitch. As a result of employing said constitution, both A phase and B phase signals are obtained, thereby enabling detection of relative position and discrimination of direction of movement.

Furthermore, as shown in FIGS. 4 and 6, cables in the form of flexible substrates 94 for obtaining signals from the above-mentioned magnetic sensor portion 92, and cover 95, which covers said flexible substrates 94, are provided.

In the drive unit having the above-mentioned constitution, by supplying a prescribed excitation current to each armature coil 42, thrust is generated based on Fleming's left hand rule between the primary and secondary sides. For example, if base member 21, to which the primary side is coupled, is taken to be the stationary side, table 22, integrated into a single unit with the secondary side, is moved by this thrust. Moreover, the position of table 22 with respect to bed 21 is detected by the position detection device described above.

The following provides an explanation of the constitution for controlling the supply of electrical power to each armature coil 42 described above.

As shown in FIG. 10, in the present embodiment, the open angle width between conductors $42a_1$ through $42f_1$ and $42a_2$ through $42f_2$ that contribute to thrust, and are possessed by each armature coil 42a through 42f (in this case, six armature coils are shown in FIG. 10, and these six armature coils are mutually distinguished by adding small letters of the alphabet from a through f to reference numeral 42 indicating armature coils in the explanation thus far for the sake of convenience in the explanation) on two sides each, is set to be equal to width Pm of each of magnetic poles 89a through 89e of field magnet 89. However, this open angle width of the armature coils is set to be roughly 2n−1 times (where n is an integer of at least 1) the magnetic pole width of field magnet 89. Normally, n is set to a value of 1, and is set to that value in the present embodiment. In addition, the interval between adjacent armature coils is set to 1/3 of width Pm of the magnetic poles. Thus, as shown in FIG. 10, the open angle width of the armature coils in the present invention is 180°, and the interval between armature coils is set at 60°.

As shown in FIG. 10, based on the above-mentioned constitution, magnetic pole discrimination elements in the form of Hall effect elements 63a through 63f are arranged in the vicinity of each armature coil 42a through 42f (six Hall effect elements are shown in FIG. 10 in this case, and the small letters of a through f are added to reference numeral 63 used to indicate Hall effect elements in the aforementioned explanation to mutually distinguish these six Hall effect elements for the sake of convenience in the explanation). These Hall effect elements 63a through 63f are correspondingly arranged so as to be of the same phase as each of the magnetic poles of field magnet 89. In the present embodiment, each of Hall effect elements 63a through 63f is arranged corresponding to conductors $42a_2$ through $42f_2$ on one side among the conductors that contribute to thrust possessed on two sides by each armature coil 42a through 42f.

These Hall effect elements 63a through 63f emit a signal (in the form a potential difference) corresponding to the lines of magnetic force emitted by each magnetic pole possessed by field magnet 89 when said field magnet 89 approaches. This signal is then fed to the above-mentioned drive circuit, and electrical power is supplied to the armature coil corresponding to the Hall effect element that emitted said signal based on that signal. This supply of electrical power is interrupted to the armature coil corresponding to a Hall effect element for which said signal has yet to be obtained or is no longer being obtained, thus enabling control to be performed. Thus, by systematically supplying a prescribed excitation current to each armature coil, thrust is generated based on Fleming's left hand rule between the primary and secondary sides. For example, if bed 21, to which the primary side is coupled, is taken to be the stationary side, table 22, integrated into a single unit with the secondary side, is moved by this thrust.

Supply of electrical power is controlled in the manner described below based on the above-mentioned constitution.

FIGS. 11(a) through 11(i) show changes in the relationship of the relative positions of armature coils 42, Hall effect elements 63 and field magnet 89 that change with movement of field magnet 89. In the present embodiment, since magnetic pole width=armature coil width=Pm, and the distance between armature coils is set to Pm/3, these changes can be considered to occur for every distance of Pm/6. Thus, all changes in relative position can be viewed in the above-mentioned FIGS. 11(a) through 11(i) In the present embodiment, a constitution is employed wherein the open angle width of the armature coils is taken to be Pm, the distance between armature coils is taken to be Pm/3, and this is then divided into 8 divisions. Thus, movement is made 30° at a time in the present embodiment as shown in FIG. 10.

Figure 11A:
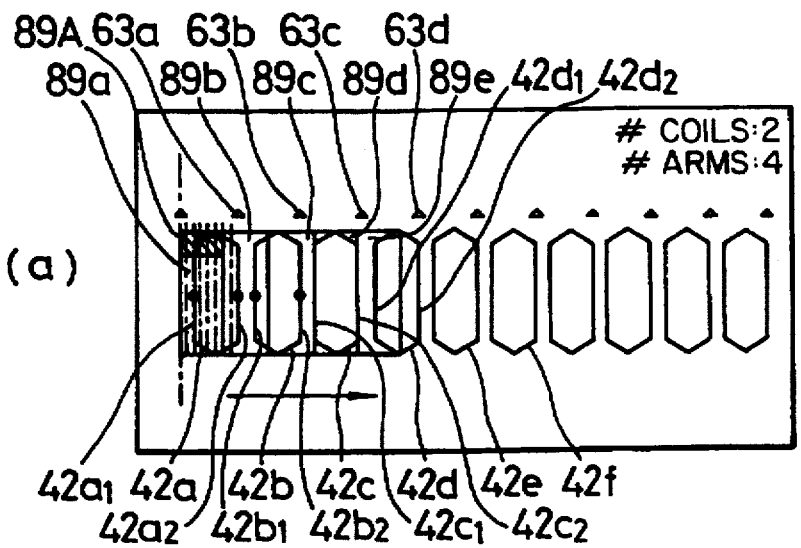

To begin with, in the case field magnet 89 is at the position shown in FIG. 11(a), namely in the case armature coil 42c and magnetic pole 89d are superposed, since only magnetic poles 89b and 89c of said field magnet 89, and excluding non-detected magnetic pole 89a, act on two Hall effect elements 63a and 63b, electrical power is supplied to two armature coils 42a and 42b respectively corresponding to these Hall effect elements. In this state, as is clear from the same drawing, since each conductor $42a_1$, $42a_2$, $42b_1$ and $42b_2$, of which two sides each are possessed by both said armature coils 42a and 42b, generates thrust by magnetic poles 89a, 89b and 89c of field magnet 89, the number of conductors that contribute to thrust is four. These are indicated with a circle in said drawing. Furthermore, since conductors $42c_1$, $42c_2$, $42d_1$ and $42d_2$ of the other two armature coils 42c and 42d either act on the boundary between adjacent magnetic poles of field magnet 89 (conductors $42c_1$ and $42c_2$) or the corresponding Hall effect elements move away from field magnet 89, thrust is not generated.

Figure 11B:
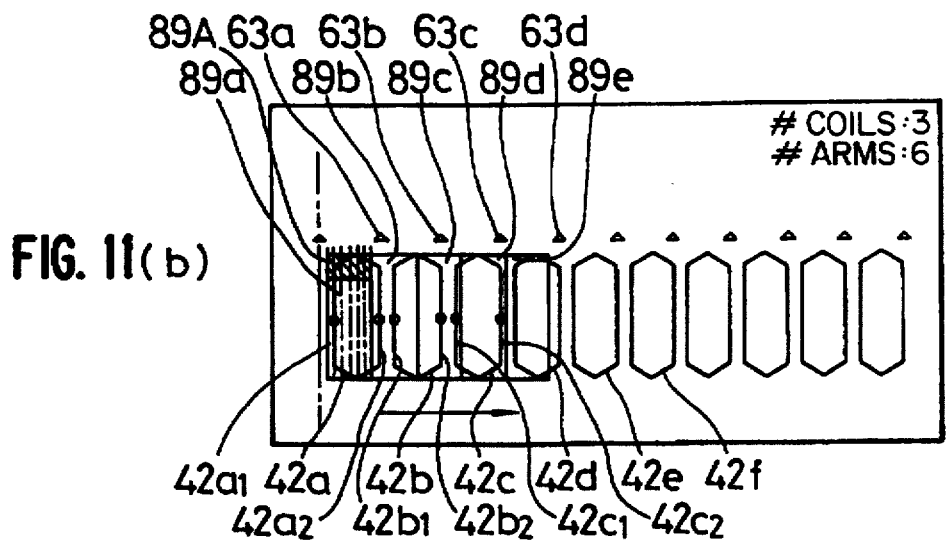
Figure 11C:
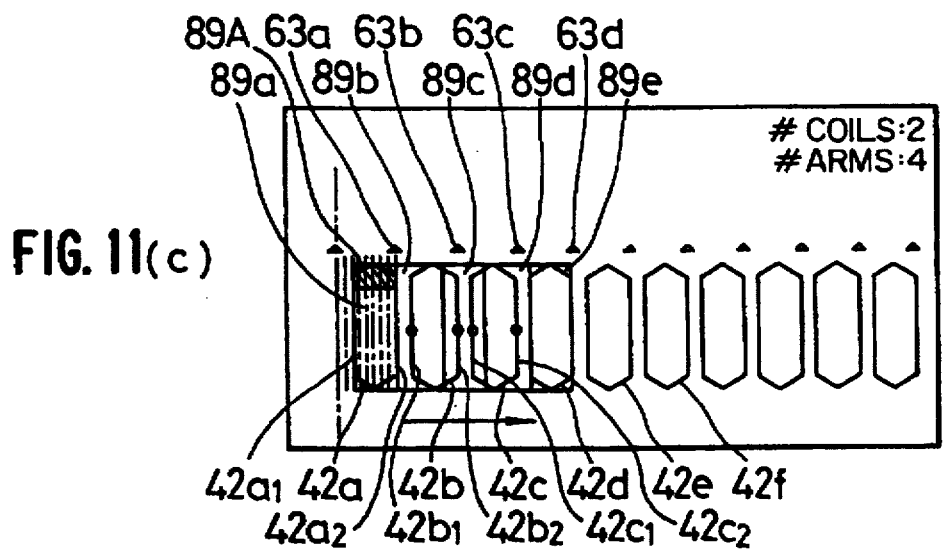
Figure 11G:
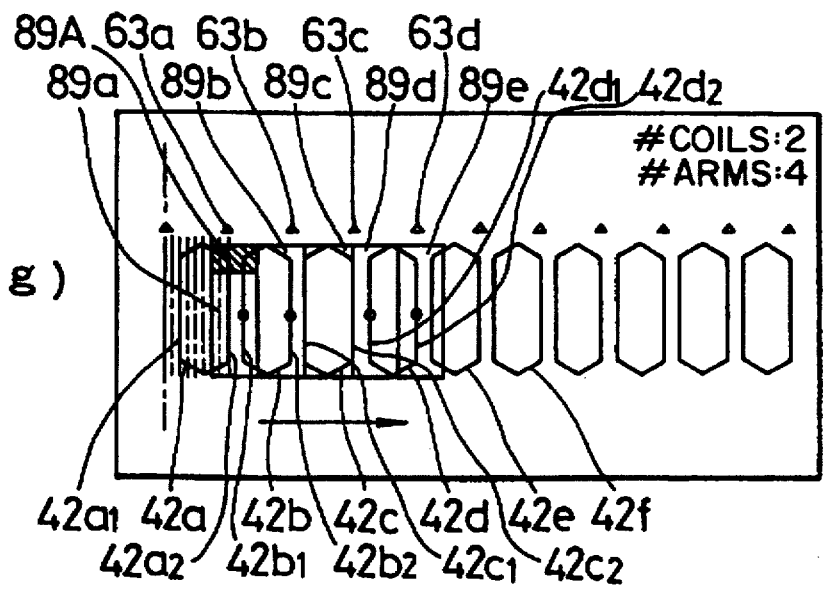
Figure 11H:
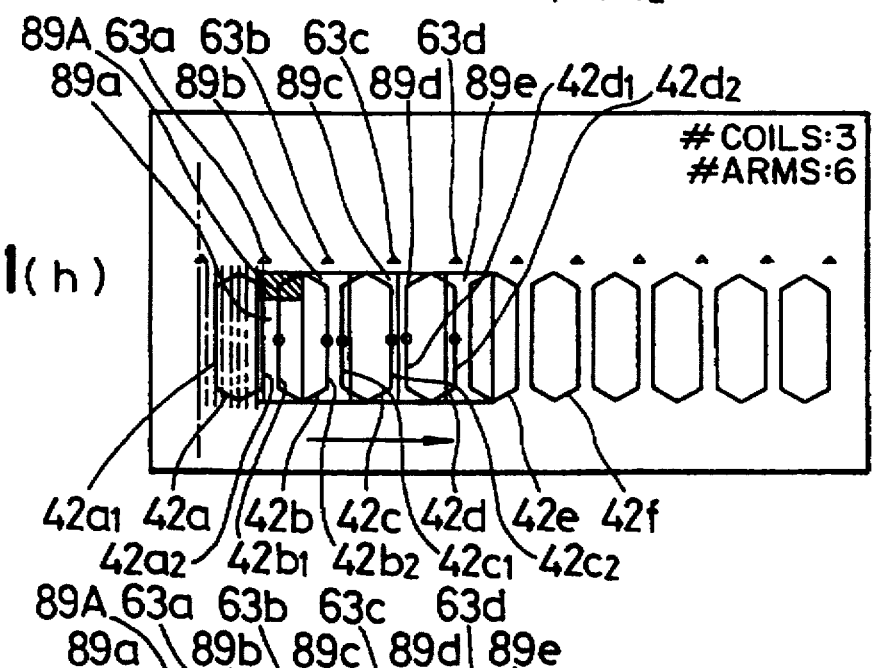
Figure 11I:
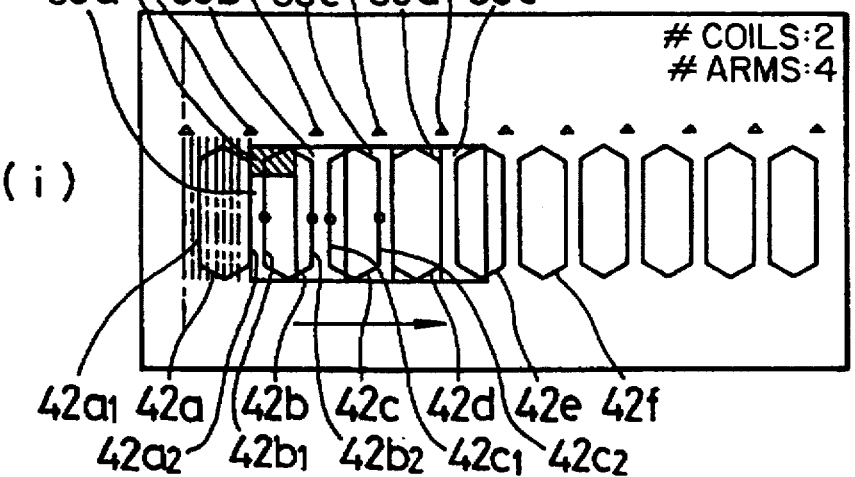

Next, in the case field magnet 89 is at the position shown in FIG. 11(b), namely in the case field magnet 89 has been moved in the direction of the arrow by Pm/6, as shown in this same drawing, each of magnetic poles 89b, 89c and 89d, excluding non-detected magnetic pole 89a, of field magnet 89 act on three Hall effect elements 63a through 63c. Accordingly, electrical power is supplied to the three armature coils 42a through 42c corresponding to these three Hall effect elements. As is clear from said drawing, in this state, since thrust is generated as a result of conductors $42a_1$, $42a_2$, $42b_1$, $42b_2$, $42c_1$ and $42c_2$, of which two sides each are possessed by each of said armature coils 42a through 42c, acting on magnetic poles 89a, 89b, 89c and 89d of field magnet 89, the number of conductors generating thrust is six.

Although the following operations are omitted since the explanation is similar, when field magnet 89 is at each of the remaining positions in FIGS. 11(c) through 11(i), the number of conductors contributing to thrust possessed by each armature coil that actually generates thrust is either four or six regardless of the position of said field magnet 89. Conversely, this applies similarly in the case of moving from the position shown in 11(*i*) toward the position shown in FIG. 11(*a*). Thus, the number of conductors of armature coils that generate thrust is either four or six regardless of the change in the relative positions of the primary and secondary sides. Accordingly, changes in thrust are relatively small, thus enabling thrust to be maintained constant at all times.

Figure 12A:
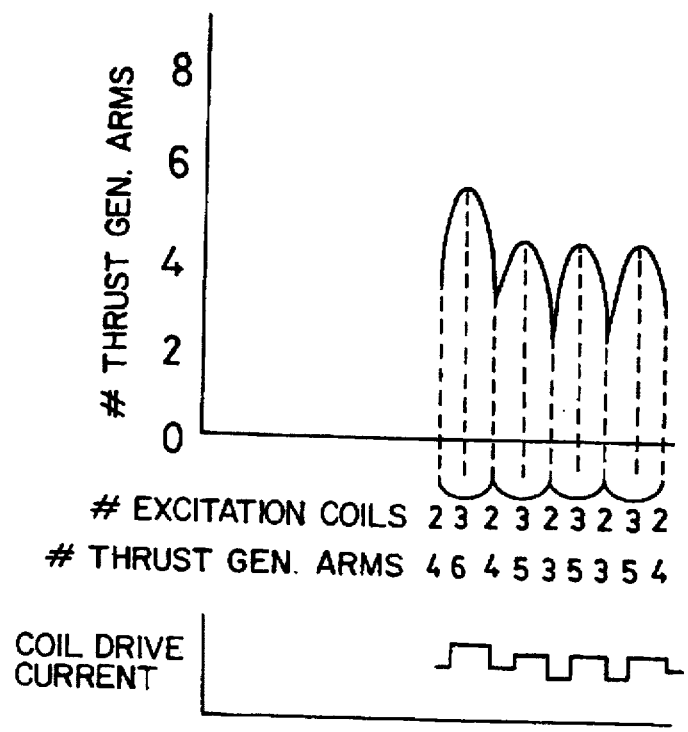
FIG. 12(a) and 12(b) are explanatory drawings that compare changes in thrust between the drive unit of the prior art and the drive unit composed with a field magnet shown in FIG. 9.
Figure 12B:
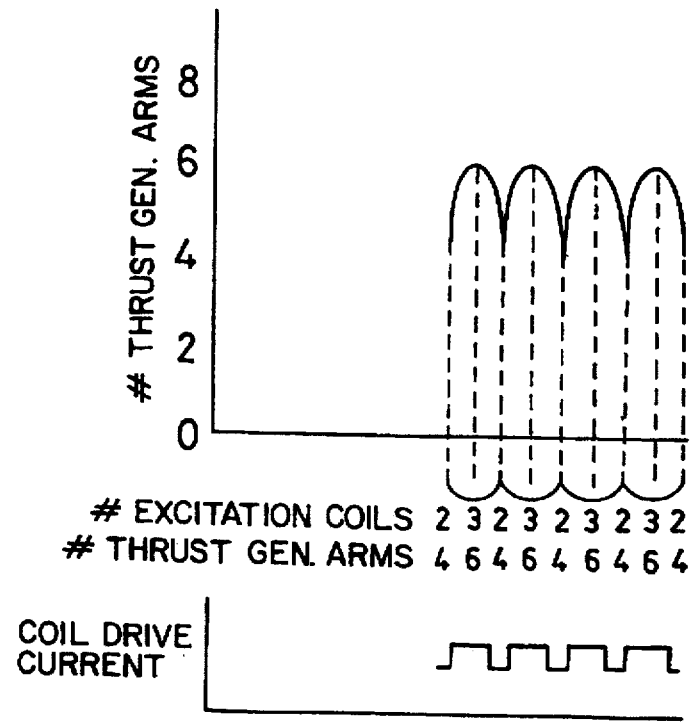

The relationship between the number of conductors of the armature coils that contribute to thrust and the thrust that is actually generated is shown in FIG. 12(*a*) and 12(*b*) wherein the relative position changes between the above-mentioned field magnet and armature coils are shown for 1 cycle. Compared with a four pole, three coil drive unit of the prior art shown in FIG. 12(*a*) in the 5 pole, 3 coil drive unit of the embodiment of the present invention shown in FIG. 12(*b*), it is clear that changes in thrust are stabilized and the size of those changes is also small. Moreover, since the change in coil drive current is also constant, it is clear that there are few changes in thrust ripple and so forth.

In addition to the constitution of a linear direct current motor as described above, the present invention also attempts to provide a linear direct current motor that is able to generate constant thrust by controlling the excitation current applied to the armature coils of the motor. In addition, the following provides an explanation of an excitation current control circuit for supplying excitation current to the armature coils of the direct current motor composed in the above manner.

Figure 13:
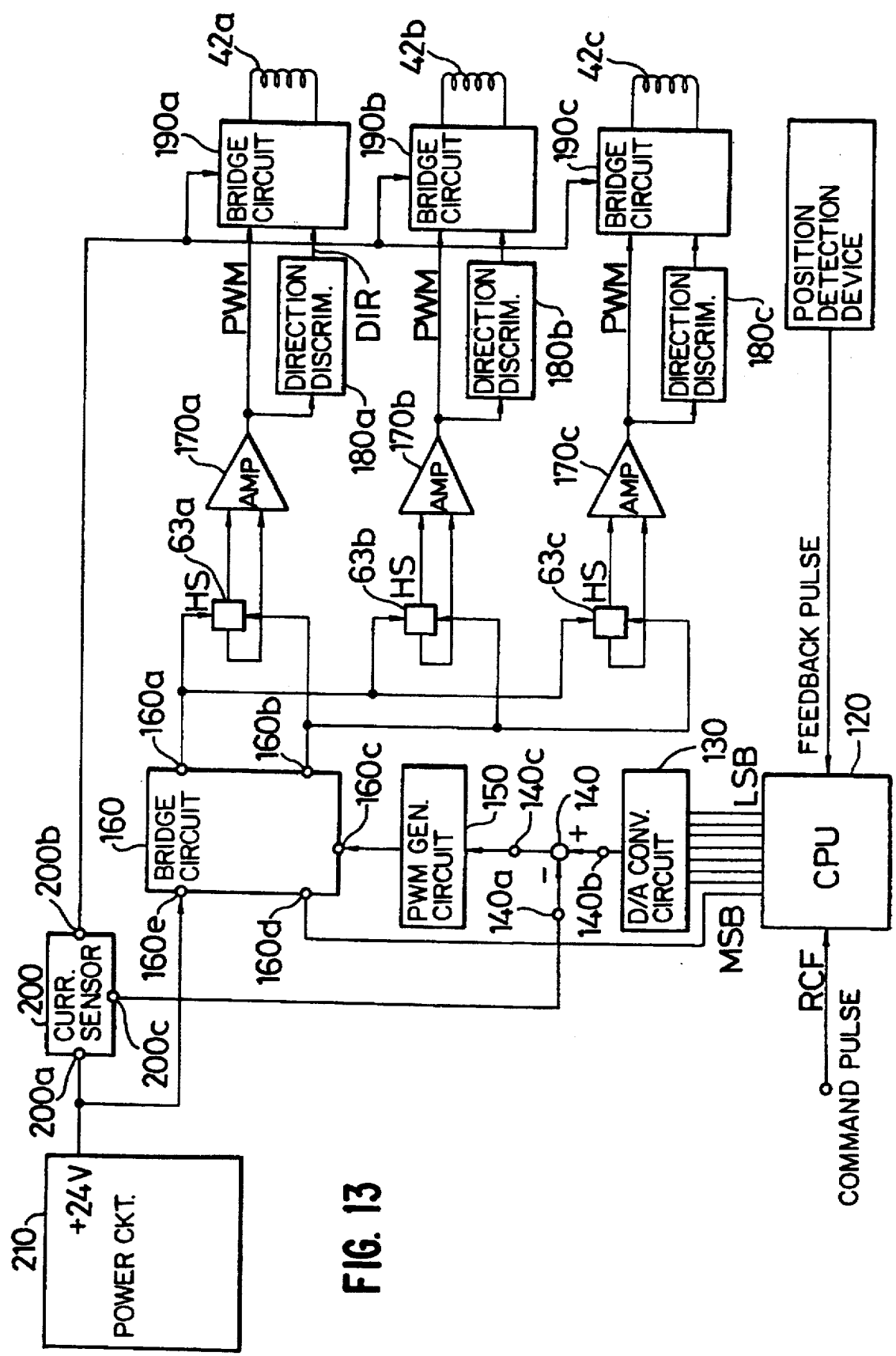
FIG. 13 is a block drawing showing the entire constitution of an excitation current supply circuit as an embodiment of the present invention.

FIG. 13 is a block diagram that indicates the overall constitution of an excitation current control circuit. As was previously described, the diagram indicates the state in which excitation current is supplied to three armature coils that contribute to thrust.

To begin with, a feedback pulse obtained according to the position detection device by the above-mentioned linear magnetic scale 91 and magnetic sensor portion 92 is supplied to processing unit 120 composed of a microprocessor. In addition, a command pulse that commands the direction of movement and amount of movement of the secondary side, namely table 22, is supplied in the form of a reference signal to processing unit 120. Processor unit 120 outputs an 8-bit or 12-bit movement command signal based on the above-mentioned two inputs. In the example shown in FIG. 13, an 8-bit processing output is indicated, and its MSB is output in the form of a direction discrimination signal indicating the direction of movement, while the remaining seven bits are output in digital form as data relating to the amount of movement.

The above-mentioned 7-bit digital output that is output in the form of data relating to the amount of movement is supplied to D/A conversion circuit 130, and converted into an analog signal by said D/A conversion circuit 130. The size of this analog output is set to, for example, 0–10 V. The analog output resulting from D/A conversion circuit 130 is supplied to analog comparator 140 (the detailed constitution of which will be described later). The analog output from a current sensor to be described later is also supplied to this analog comparator 140, and the comparator output based on the difference between these is supplied to PWM generation circuit 150. PWM generation circuit changes the duty ratio of the output pulse corresponding to the comparator output, and its output pulse is supplied to bridge circuit 160.

Although the detailed constitution of bridge circuit 160 will be described later, a direction discrimination signal in the form of an MSB output, which indicates the direction of movement output from the above-mentioned processing unit 120, is supplied to this bridge circuit 160. When this MSB is "1", only the first set of opposing sides of the bridge circuit are switched on, while when this MSB is "0", only the second set of opposing sides of the bridge circuit are switched on. Thus, a PWM signal, for which the polarity is inverted according to whether MSB is "0" or "1", is generated to output terminals 160*a* and 160*b* of bridge circuit 160.

Each polarization power source terminal of each magnetic pole discrimination element in the form of Hall effect elements (although the Hall effect elements are arranged in a large number corresponding to each armature coil 42 as was previously described, these will be indicated using reference numerals 63*a*, 63*b* and 63*c* for the sake of convenience of the explanation) is connected between each output terminal 160*a* and 160*b* of bridge circuit 160.

As is commonly known, the output from each Hall effect element 63*a*, 63*b* and 63*b* is either inverted or not inverted corresponding to the polarity (N or S) of field magnet 89 of the opposing moving side, and the output increases or decreases in proportion to the magnetic flux density. Each of the outputs of these Hall effect elements 63*a*, 63*b* and 63*c* is respectively supplied to operational amplifiers 170*a*, 170*b* and 170*c*, and each output that has been amplified by amp 170*a*, 170*b* and 170*c* is supplied to direction discrimination circuits 180*a*, 180*b* and 180*c*, and transistor bridge circuits 190*a*, 190*b* and 190*c*. Although the constitutions of direction discrimination circuits 180*a*, 180*b* and 180*c* will be described later, these direction discrimination circuits 180*a*, 180*b* and 180*c* generate a direction discrimination output that indicates the direction of movement of the secondary side from the input PWM signal. Each direction discrimination output is then output to each transistor bridge circuit 190*a*, 190*b* and 190*c*. Although the detailed constitution of transistor bridge circuits 190*a*, 190*b* and 190*c* will be described later, they have nearly the same constitution as the previously described bridge circuit 140. When the direction discrimination output from each of the above-mentioned direction discrimination circuits 180*a*, 180*b* and 180*c* is "1", only the first set of opposing sides of each transistor bridge circuit is switched on, while when the direction discrimination output is "0", only the second set of opposing sides of each transistor bridge circuit is switched on. Thus, control circuit is supplied to the armature coil connected to each transistor bridge circuit 190*a*, 190*b* and 190*c* (although a large number of armature coils are arranged on bed 21 on the stationary side as was previously described, these are indicated with only reference numerals 42*a*, 42*b* and 42*c* for the sake of convenience in the explanation).

Figure 14:
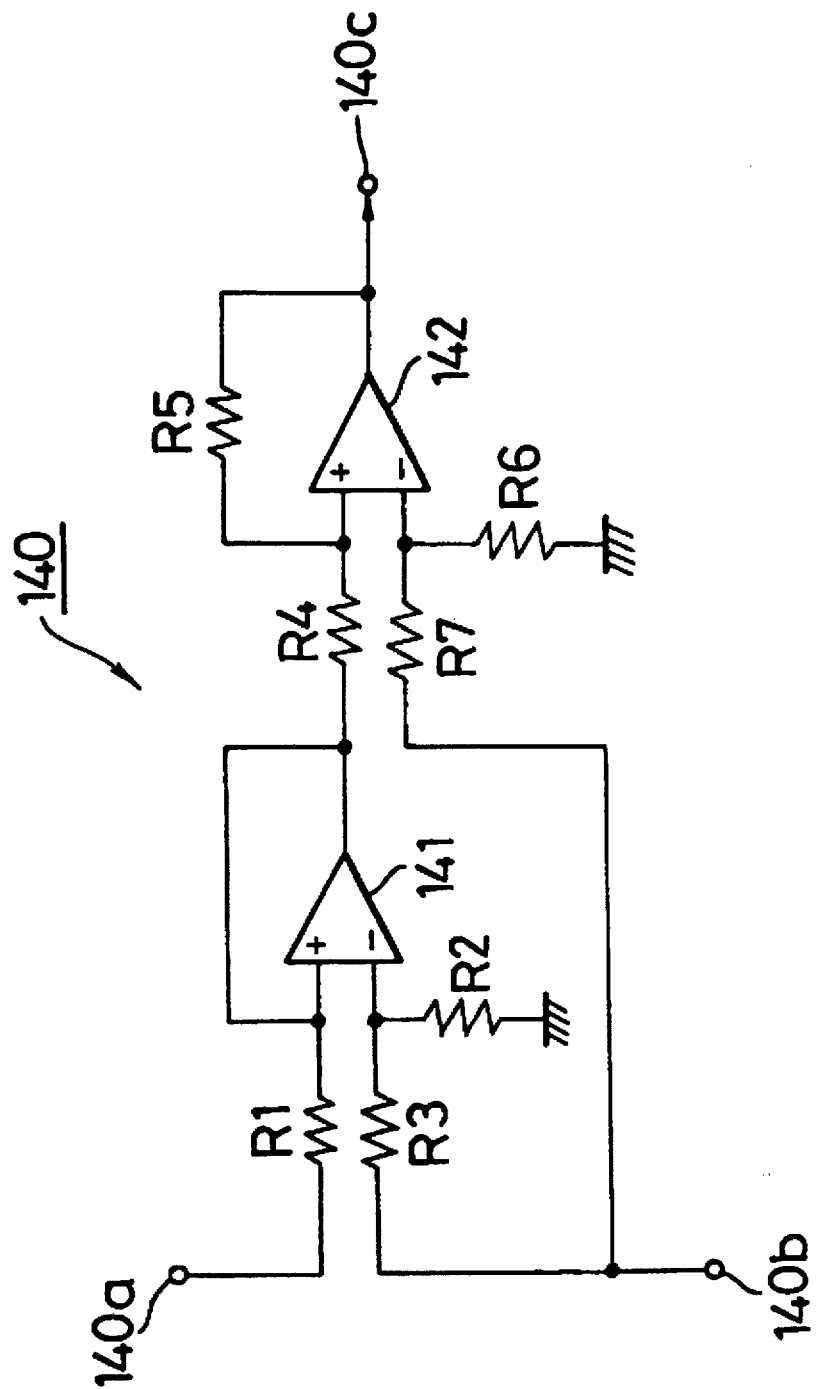
FIG. 14 is a connection diagram showing a specific example of a comparator circuit in the excitation current supply circuit shown in FIG. 13.

In addition, in this constitution, drive current is supplied to each transistor bridge circuit 190*a*, 190*b* and 190*c* by power circuit 210 by means of current sensor circuit 200 to be described later. FIG. 14 shows a specific constitution of the above-mentioned analog comparator 140. This analog comparator 140 is basically composed of a first comparator circuit 141, consisting of an integration circuit, and second comparator circuit 142, and is equipped with two comparator input terminals 140*a* and 140*b*, and a comparator output terminal 140*c*.

To begin with, the non-inverted input terminal and output terminal of the first comparator circuit 142 are directly connected, and a signal corresponding to the amount of current input to the armature coil supplied with electrical power from the above-mentioned current sensor circuit 200 by means of input resistor R1 is supplied to this non-inverted input terminal by means of input terminal 140*a*. On the other hand, together pull-down resistor R2 being connected between the inverted input terminal of the first comparator circuit 141 and the reference electrical potential (ground), the analog output relating to the amount of movement from the above-mentioned D/A conversion circuit 130 by means of input resistor R3 is supplied to the inverted input terminal of first comparator circuit 141 by means of input terminal 140b. Thus, only when the signal level corresponding to the amount of current flowing into the armature coils supplied from the above-mentioned current sensor circuit 200 surpasses the analog output level relating to the amount of movement from the above-mentioned D/A conversion circuit 130, is an output generated from the above-mentioned first comparator circuit 141 corresponding to that surpassing amount.

The output of this first comparator circuit 141 is supplied to the non-inverted input terminal of second comparator circuit 142 by means of input resistor R4. The output terminal of second comparator circuit 142 is connected to a non-inverted input terminal by means of return resistor R5, while its inverted input terminal is connected to the reference potential by means of pull-down resistor R6. An analog output relating to the amount of movement from the above-mentioned D/A conversion circuit 130 is supplied by means of resistor R7 to the inverted input terminal of second comparator circuit 142.

Thus, an output, in which the output corresponding to the above-mentioned increased amount (surpassed amount) is subtracted from the analog output relating to the amount of movement from the above-mentioned D/A conversion circuit 130, is generated from the output terminal of second comparator circuit 142, namely output terminal 140c of the analog comparator 142. As was described above, this output signal is converted to a PWM signal by PWM generation circuit 150, and then supplied to bridge circuit 160.

Figure 15:
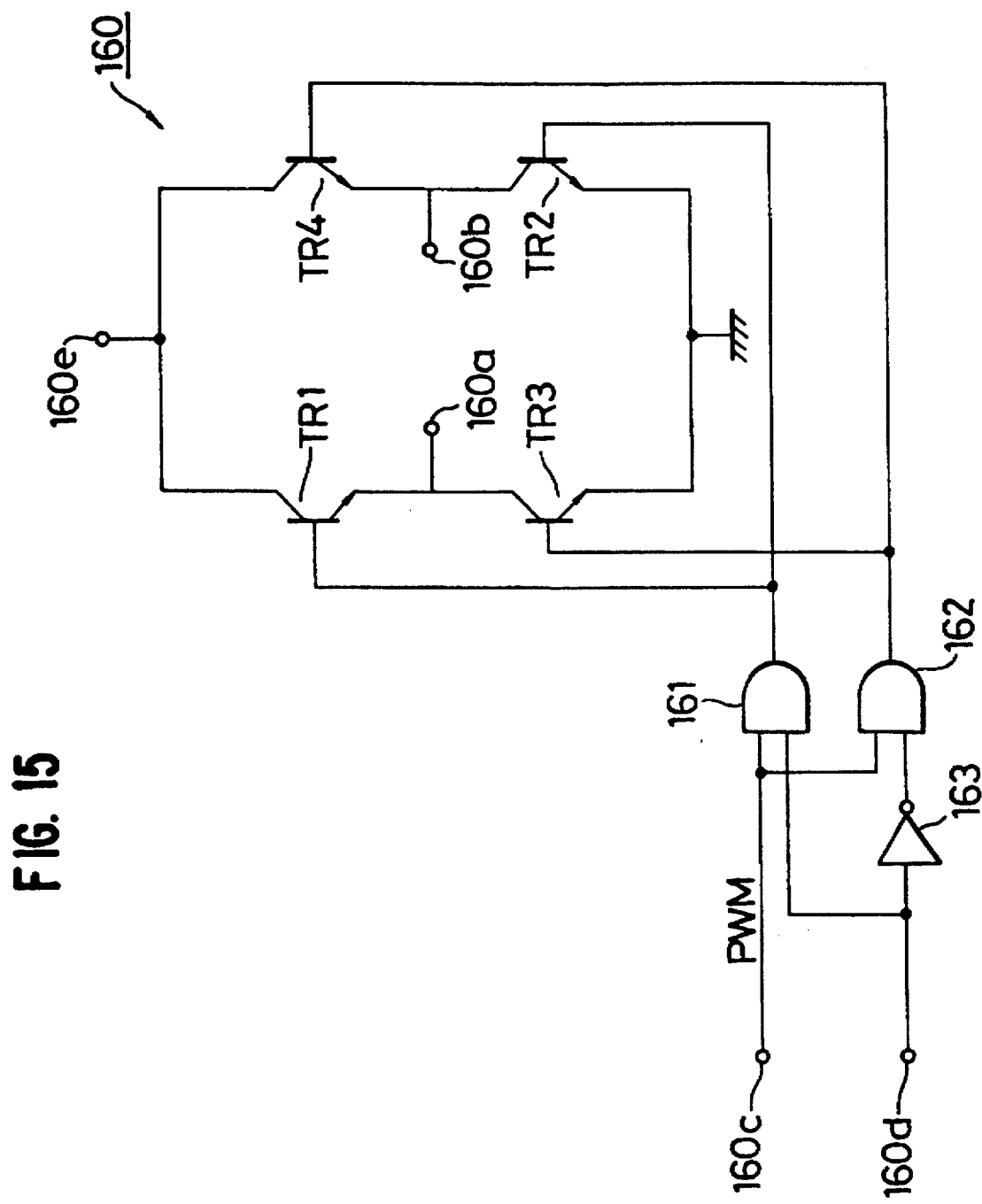
FIG. 15 is a connection diagram showing a specific example of a bridge circuit in the excitation current supply circuit shown in FIG. 13.

Next, FIG. 15 indicates the specific constitution of bridge circuit 160. This bridge circuit 160 is equipped with a pair of output terminals 160a and 160b as previously mentioned, along with input terminal 160c for PWM signals from PWM generation circuit 150, input terminal 160d into which direction discrimination signals are input that indicate the direction of movement output as MSB in the above-mentioned processing unit 120, and drive current input terminal 160e from power circuit 210.

Input terminal 160c for PWM signals from PWM generation circuit 150 is connected to one of the respective input terminals each of 1st and 2nd AND gates 181 and 182. In addition, together with the direction discrimination signal output as MSB being supplied to the other input terminal of 1st AND gate 161 by means of input terminal 160d, it is also supplied to the other input terminal of 2nd AND gate 162 by means of NOT circuit 163. The output terminal of 1st AND gate 181 is respectively connected to the bases of 1st and 2nd NPN transistors Tr1 and Tr2 that compose a bridge circuit. In addition, the output terminal of 2nd AND gate 162 is respectively connected to the bases of 3rd and 4th NPN transistors Tr3 and Tr4 that also compose a bridge circuit.

With respect to the above-mentioned 1st through 4th transistors Tr1 through Tr4, a 1st set of opposing sides are composed by 1st and 2nd transistors Tr1 and Tr2, while a 2nd set of opposing sides are composed by 3rd and 4th transistors Tr3 and Tr4. In addition, each of the collectors of the 1st and 4th transistors are connected in common, and compose drive current input terminal 160e from power circuit 210. In addition, each of the emitters of the 2nd and 3rd transistors are connected in common, and are connected to the reference potential. Moreover, the contact point of the emitter of 1st transistor Tr1 and the collector of 3rd transistor Tr3 composes output terminal 160a, while the emitter of 4th transistor Tr4 and the collector of 2nd transistor Tr2 composes output terminal 160b.

In the above-mentioned constitution, a MSB output in the form of a direction discrimination signal, which indicates the direction of movement and is output from the above-mentioned processing unit 120, is supplied by means of input terminal 160d. In the case this MSB output is "1", 1st AND gate 161 is open and 2nd AND gate 162 is closed. Accordingly, the PWM signal supplied by means of input terminal 160c passes through this 1st AND gate 161 and drives 1st and 2nd transistors Tr1 and Tr2 that compose a 1st set of opposing sides. Thus, output terminal 160a becomes a positive electrode output for PWM signals, while output terminal 160b becomes a negative electrode output for PWM signals.

On the other hand, in the case the above-mentioned MSB output is "0", 1st AND gate 161 is closed and 2nd AND gate 162 is open due to the action of inverter 163. Accordingly, PWM signals supplied by means of input terminal 160c pass through 2nd AND gate 162 and drive 3rd and 4th transistors Tr3 and Tr4 that compose a 2nd set of opposing sides. Thus, output terminal 160b becomes a positive electrode output for MSB signals, while output terminal 160a becomes a negative electrode output for PWM signals.

Thus, PWM signals, for which the polarity is inverted according to whether MSB is "1" or "0", are supplied to the respective polarization power source terminals of magnetic pole discrimination elements in the form of each Hall effect element 63a, 63b and 63c.

Figure 16:
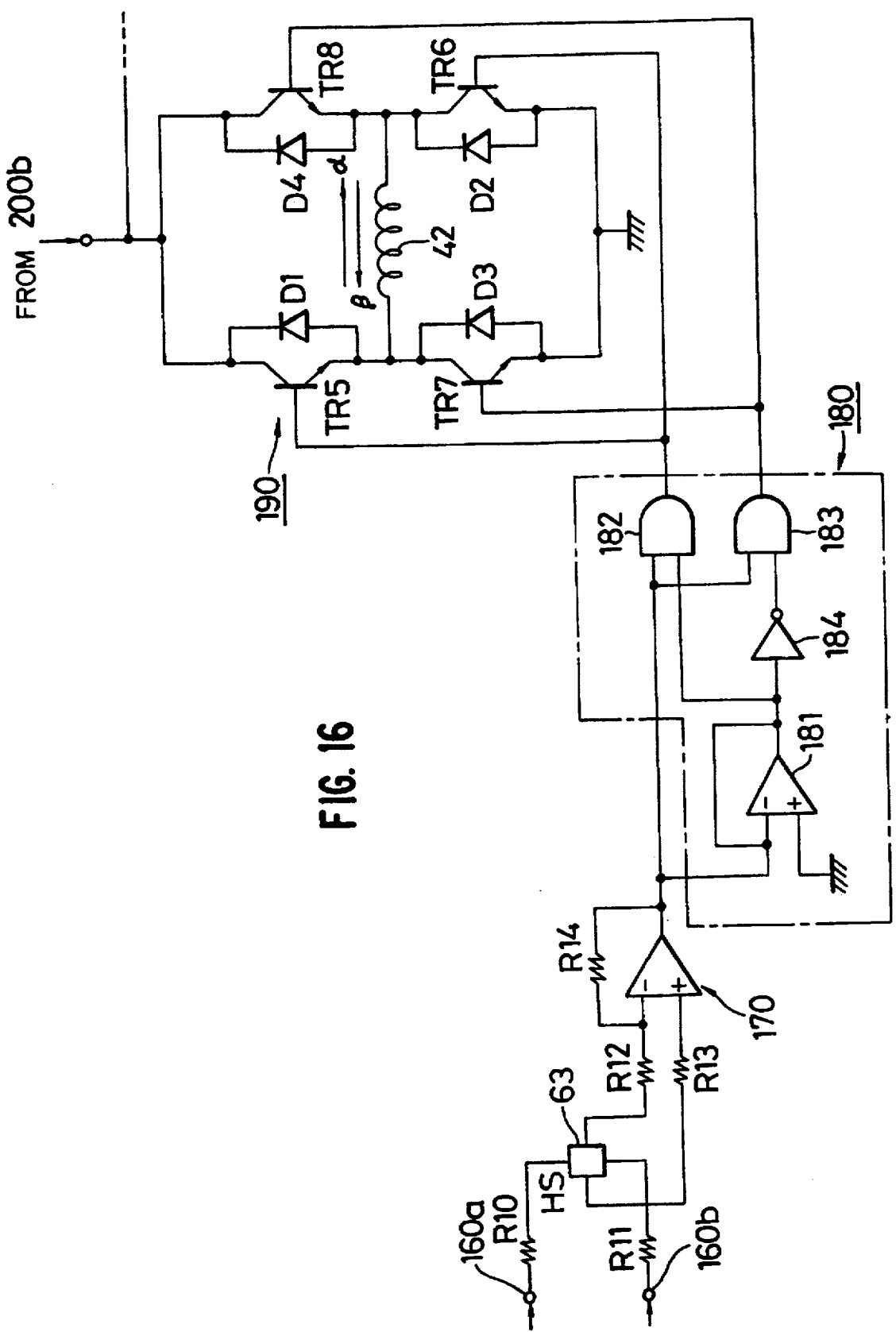
FIG. 16 is a connection diagram showing a specific example of a direction discrimination circuit and transistor bridge circuit in the excitation current supply circuit shown in FIG. 13.

FIG. 16 indicates a specific connection constitution of magnetic pole discrimination elements in the form of Hall effect elements 63a through 63c, operational amplifiers 170a through 170c, direction discrimination circuits 180a through 180c, transistor bridge circuits 190a through 190c and armature coils 42a through 42c. Although each circuit is composed of 3 sets of components as described above, only 1 representative set of components is shown in FIG. 16, and the small letters attached to end of each reference numeral have been omitted.

To begin with, the PWM output from the pair of output terminals 160a and 160b of the above-mentioned bridge circuit 160 are respectively applied to the polarization electrodes of a magnetic pole discrimination element in the form of Hall effect element 63 by means of buffer resistors R10 and R11. The outputs according to Hall effect element 63 are respectively applied to the inverted input terminal and non-inverted input terminal of operational amplifier 150 by means of input resistors R12 and R13. Return resistor R14 is connected between the output terminal and inverted input terminal of operational amplifier 150, and the gain of operational amplifier 150 is set according to this return resistor R14.

The amplified output according to the above-mentioned operational amplifier 170 is supplied to the inverted input terminal of operational amplifier 181 that composes direction discrimination circuit 180. The output terminal and inverted input terminal of this operational amplifier 181 are connected, and the non-inverted input terminal is connected to the reference potential. Thus, the output of a direction discrimination signal in the form of "1" or "0" is extracted from this PWM signal.

On the other hand, the output terminal of operational amplifier 170 is connected to one each of the input terminals of 1st and 2nd AND gates 182 and 183. Together with the output terminal of operational amplifier 181 being supplied to the other input terminal of 1st AND gate 182, it is also supplied to the other input terminal of 2nd AND gate 183 by means of NOT circuit 184. The output terminal of 1st AND gate 182 is respectively connected to the bases of 1st and 2nd NPN transistors Tr5 and Tr6 that compose a bridge circuit. In addition, the output terminal of 2nd AND gate 183 is respectively connected to the bases of 3rd and 4th NPN transistors Tr7 and Tr8 that also compose a bridge circuit.

With respect to the above-mentioned 1st through 4th transistors Tr5 through Tr8, a 1st set of opposing sides is composed by 1st and 2nd transistors Tr5 and Tr6, while a 2nd set of opposing sides is composed by 3rd and 4th transistors Tr7 and Tr8. In addition, each of the collectors of the 1st and 4th transistors are connected in common, and connected to output terminal 200b of the above-mentioned current sensor 200. In addition, each of the emitters of 2nd and 3rd transistors Tr6 and Tr7 are connected in common, and connected to the reference potential. Moreover, one end of armature coil 42 is connected to the connection point between the emitter of 1st transistor Tr5 and the collector of 3rd transistor Tr7, while the other end of armature coil 42 is connected to the connection point between the emitter of 4th transistor Tr8 and the collector of 2nd transistor Tr6.

Moreover, the cathodes and anodes of diodes D1 through D4 are respectively connected between each of the collectors and emitters of 1st through 4th transistors Tr5 through Tr8.

In the above-mentioned constitution, in the case the direction discrimination signal from the above-mentioned operational amplifier 181 is "1", 1st AND gate 182 is open and 2nd AND gate 183 is closed. Accordingly, the PWM signal from operational amplifier 170 passes through this 1st AND gate 182 and drives 1st and 2nd transistors Tr5 and Tr6 that compose a 1st set of opposing sides. Thus, a positive output based on this PWM signal is applied to one end of armature coil 42 connected to the emitter of this 1st transistor Tr5, and a negative output based on this PWM signal is applied to the other end of armature coil 42 connected to the collector of 2nd transistor Tr6. As a result, current based on the PWM signal in the direction indicated by the arrow (α) in FIG. 16 is supplied to armature coil 42, and the direction of movement and amount of movement on the side of field magnet 89 corresponding to armature coil 42 is determined according to Fleming's left hand rule.

On the other hand, in the case the direction discrimination signal from the above-mentioned operational amplifier 181 is "0", 1st AND gate 182 is closed and 2nd AND gate 183 is open due to the action of NOT circuit 184. Accordingly, the PWM signal from operational amplifier 170 passes through this 2nd AND gate 183 and drives 3rd and 4th transistors Tr7 and Tr8 that compose a 2nd set of opposing sides. Thus, a positive output based on this PWM signal is applied to the other end of armature coil 42 connected to the emitter of this 4th transistor Tr8, and a negative output based on this PWM signal is applied to the one end of armature coil 42 connected to the collector of 3rd transistor Tr7. As a result, current based on the PWM signal in the direction indicated by the arrow (β) in FIG. 16 is supplied to armature coil 42, and the direction of movement and amount of movement on the side of field magnet 89 corresponding to armature coil 42 is determined according to Fleming's left hand rule.

Figure 17:
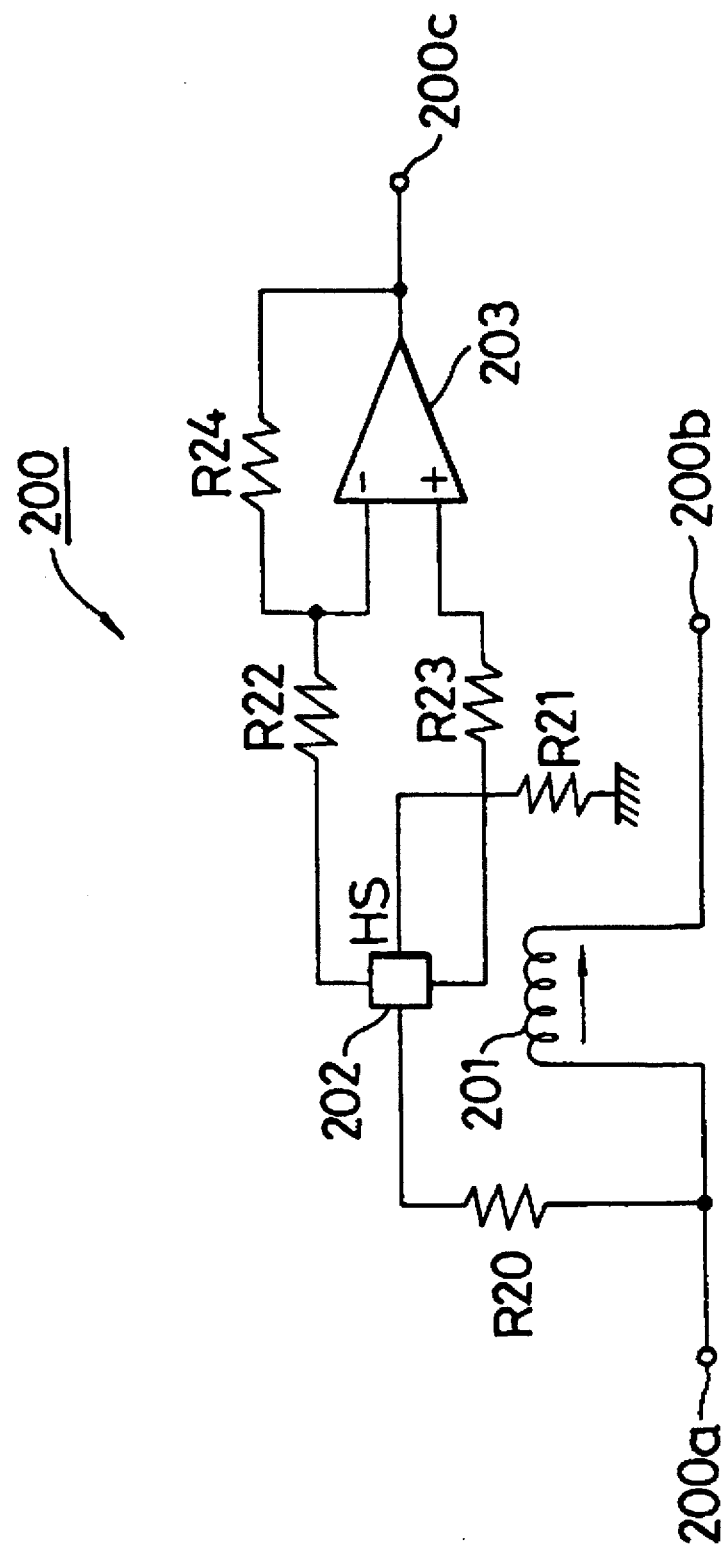
FIG. 17 is a connection diagram showing a specific example of a current sensor circuit in the excitation current supply circuit shown in FIG. 13.

Furthermore, diodes D1 through D4, for which their respective cathodes and anodes are connected between each collector and emitter of 1st through 4th transistors Tr5 through Tr8, protect each transistor Tr5 through Tr8 from back voltage by bypassing said back voltage of armature coil 42 generated during interruption of current to armature coil Next, FIG. 17 indicates a specific example of current sensor circuit 200. This current sensor circuit 200 is equipped with current input terminal 200a, which receives drive current from power circuit 210, current output terminal 200b, and sensor output terminal 200c. Excitation coil 201 is inserted between current input terminal 200a and current output terminal 200b, and this excitation coil 201 allows drive current to pass that flows into armature coils 42a, 42b and 42c. A magnetic pole discrimination element in the form of Hall effect element 202 is arranged in a magnetically coupled state in the vicinity of excitation coil 201, and one of the polarization electrodes of this Hall effect element 202 is connected to current input terminal 200a by means of current limiting resistor R20, while the other polarization electrode of Hall effect element 202 is connected to the reference potential by means of current limiting resistor R21.

The pair of output terminals of Hall effect element 202 are respectively connected to the inverted input terminal and non-inverted input terminal of operational amplifier 203 by means of input resistors R22 and R23. Return resistor R24 is connected between the output terminal and inverted input terminal of this operational amplifier 203, and the gain of this operational amplifier 203 is set according to this return resistor R24.

In current sensor circuit 200 according to the constitution described above, the sum of the coil drive current that flows into armature coils 42a, 42b and 42c passes through excitation coil 201, and Hall effect element 202 generates a Hall effect voltage as a result of a magnetic flux proportional to the amount of that current acting on Hall effect element 202. That Hall effect voltage is amplified by operational amplifier 183, brought to output terminal 200c, and supplied to comparator input terminal 140a of the above-mentioned analog comparator 140 by means of output terminal 200c.

As a result of employing the constitutions of each of the circuits shown in FIGS. 13 through 17 as described above, together with information relating to the amount of movement in the form of an analog signal being supplied from D/A conversion circuit 130 to analog comparator 140, a sensor output is also supplied to analog comparator 140 from current sensor circuit 200. Analog comparator 140 then extracts this differential information and a PWM signal is produced in PWM generation circuit 150 based on this differential information. As a result of controlling coil drive current for armature coils 42a, 42b and 42c based on this PWM signal, the sum of the coil drive current (coil drive current) that flows into armature coils 42a, 42b and 42c is continuously controlled at a constant level. In other words, the excitation current supply circuit shown in FIG. 13 functions to control the current output to the armature coils in the form of a constant current.

Figure 18:
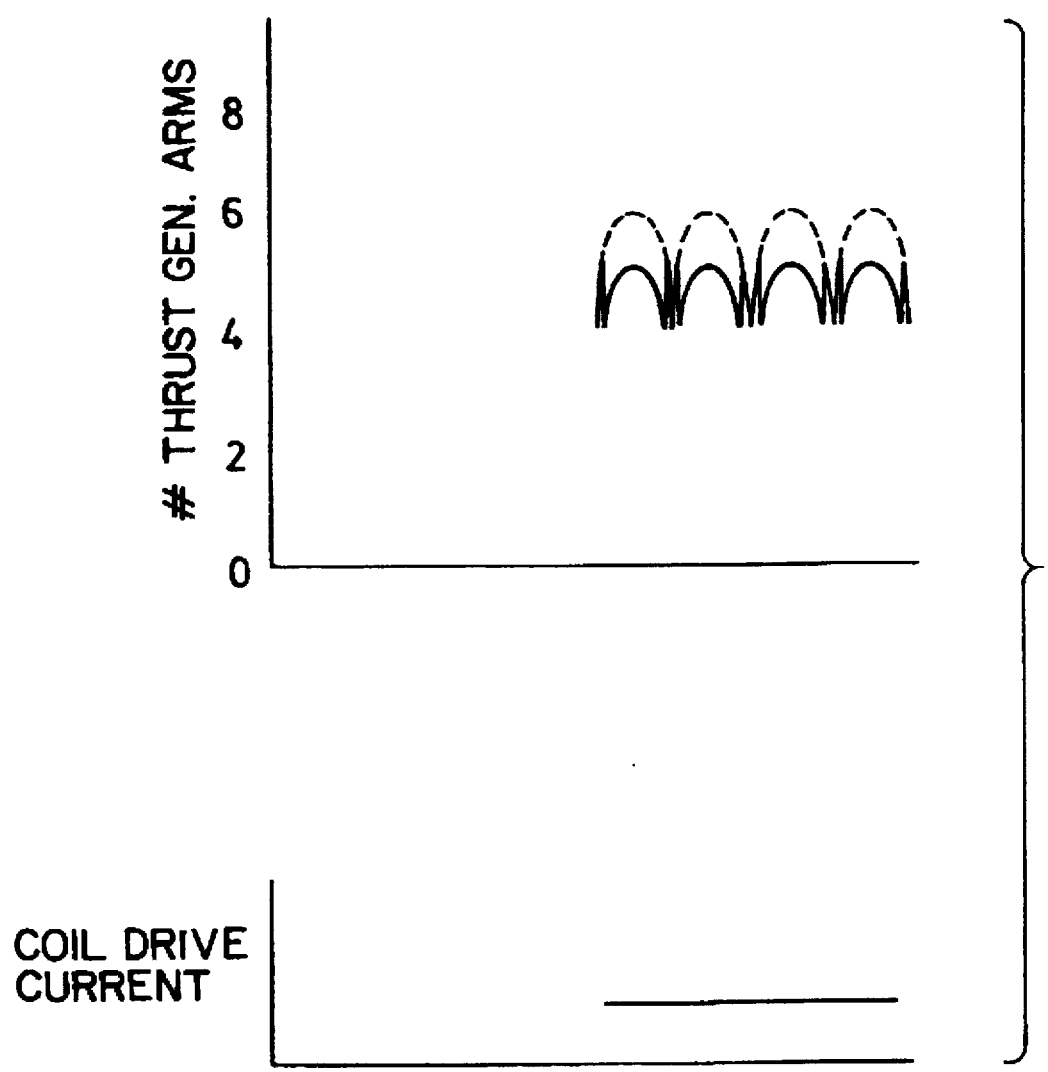
FIG. 18 is an explanatory drawing indicating changes in thrust of a linear direct current motor in the case of using the excitation current supply circuit shown in FIG. 13.

FIG. 18 is a thrust estimation diagram based on the number of thrust generation arms in the case of driving the linear direct current motor having the constitution shown in the above-mentioned FIGS. 4 through 9 using the excitation current supply circuit indicated in FIGS. 13 through 17. FIG. 18 is shown to correspond to the above-mentioned FIG. 12.

In the case of using the excitation current supply circuit shown in FIGS. 13 through 17, as shown in FIG. 18, coil drive current is nearly constant. Thus, in comparison with of FIG. 12(b), with respect to the thrust of a linear direct current motor in the case of using an excitation current supply circuit having the constant current properties indicated with the solid line, changes in thrust are significantly reduced in comparison with the properties indicated in of FIG. 12(b) (indicated with a broken line in FIG. 18), thus enabling the providing of a linear direct current motor having a low level of thrust ripple.

Furthermore, in FIG. 10, if the position at which each Hall effect element is currently arranged, namely the position of conductors $42a_2$ through $42f_2$ on the right side of each armature coil $42a$ through $42f$, is expressed as an electrical angle of 0° (in the drawing, however, the position of Hall effect element $63e$, namely the position of conductor $42e_2$ of armature coil $42e$, is indicated as 0° as a representative example), the electrical angle positions of the conductors of each armature coil are as shown in the drawing in the case of a linear direct current motor like that in the present embodiment having 4 poles and 3 coils.

In addition, although a guide unit having a mechanical constitution is shown for the guiding device that performs mutual guiding of the primary side and secondary side in the above-mentioned embodiment, a guiding device can be employed having a constitution that relatively levitates both primary and secondary sides by the pressure of a fluid (air or oil) or magnetic force.

In addition, although a moving magnet type of linear direct current motor is shown in the above-mentioned embodiment wherein the side containing armature coils 42 is taken to be the stationary side and the side containing field magnet 89 is taken to be the moving side, the present invention can also be applied to a moving coil type of linear direct current motor.

Moreover, the present invention may be similarly applied in the form of another embodiment in the case of bed 21 and so forth having a certain curvature, and the present invention performing curved motion.

According to the present invention as has been explained above, since the size of the change in the number of conductors of armature coils that generate thrust is small regardless of changes in the relative positions of the primary and secondary sides, the present invention offers the advantage of being able to maintain stable thrust at all times. In addition, since the drive current that is applied to the armature coils is controlled to a constant current, the present invention is able to further minimize changes in thrust, thereby being able to provide a linear direct current motor having a low level of thrust ripple.

What is claimed is:

1. A linear direct current motor equipped with: a field magnet in which P number of poles (P being an integer of at least 2) are arranged and magnetized so that they are sequentially different; a group of armature coils wound so that the open angle width of the conductors contributing to thrust is roughly 2n−1 times (where n is an integer of at least 1) the magnetic pole width of said field magnet, which relatively drive said field magnet by being arranged so as to oppose said field magnet and supplying excitation current by an excitation current supply circuit; and, magnetic pole discrimination elements, provided corresponding to each said armature coil, which perform discrimination of the magnetic poles of said field magnet; wherein, the endmost magnetic poles of said field magnet are non-detected magnetic poles with respect to said magnetic pole discrimination elements, and said excitation current supply circuit is composed so that current output to the armature coils has constant current properties.

2. The linear direct current motor as set forth in claim 1 wherein said non-detected magnetic poles are composed with a non-magnetic material.

3. The linear direct current motor as set forth in claim 1 wherein said non-detected magnetic poles are attached to said field magnet and integrated into a single unit with said field magnet.

4. The linear direct current motor as set forth in claim 1 wherein said non-detected magnetic poles are formed by cutting away a portion of them.

5. The linear direct current motor as set forth in claim 1 wherein said excitation current supply circuit controls the amount of current supplied to armature coils at a constant current with a current sensor that detects the amount of current that flows into said armature coils based on a signal that corresponds to the amount of current detected from said current sensor.

6. The linear direct current motor as set forth in claim 5 wherein said excitation current supply circuit includes a comparator that subtracts a signal corresponding to the amount of current detected by said current sensor with respect to a control signal according to a feedback pulse, obtained by a position detection device composed of a linear magnetic scale and magnetic sensor portion, and command pulse that commands the amount of movement.

7. The linear direct current motor as set forth in claim 6 wherein the output of said comparator is converted into a PWM signal by a PWM generation circuit, and then used as the polarization power source of Hall effect elements in the form of said magnetic pole discrimination elements.

* * * * *